United States Patent [19]
Tajima et al.

[11] Patent Number: 5,254,659
[45] Date of Patent: Oct. 19, 1993

[54] INSULATING COATING COMPOSITION, SOLDERABLE INSULATED WIRES, PRODUCTION PROCESS OF THE INSULATED WIRES AND FLYBACK TRANSFORMERS USING THE INSULATED WIRES

[75] Inventors: Tetsuo Tajima, Fujisawa; Ryoichi Sudo, Yokosuka; Makoto Kobata, Yokohama; Fusaji Shoji, Yokohama; Masayoshi Kitadani, Yokohama; Kouji Oikawa, Esashi, all of Japan

[73] Assignee: Hitachi, Ltd., Tokyo, Japan

[21] Appl. No.: 675,951

[22] Filed: Mar. 27, 1991

[30] Foreign Application Priority Data

| Mar. 27, 1990 | [JP] | Japan | 2-77309 |
| Apr. 13, 1990 | [JP] | Japan | 2-96428 |
| Sep. 5, 1990 | [JP] | Japan | 2-233254 |
| Sep. 20, 1990 | [JP] | Japan | 2-252547 |

[51] Int. Cl.$^5$ ............................................. C08G 18/80
[52] U.S. Cl. ........................................ 528/45; 528/53; 528/73; 528/74; 528/84; 528/351; 528/353; 427/117; 427/120; 427/388.1; 427/388.2; 428/458
[58] Field of Search ............ 528/45, 53, 73, 74, 528/84, 351, 353; 427/117, 120, 388.1, 388.2; 428/458

[56] References Cited

U.S. PATENT DOCUMENTS

4,983,715 1/1991 Miwa et al. ........................ 528/353

FOREIGN PATENT DOCUMENTS

| 63-69819 | 3/1988 | Japan. |
| 63-289711 | 11/1988 | Japan. |
| 1-90268 | 4/1989 | Japan. |
| 1-124905 | 5/1989 | Japan. |

*Primary Examiner*—Maurice J. Welsh
*Attorney, Agent, or Firm*—Antonelli, Terry, Stout & Kraus

[57] ABSTRACT

This invention relates to insulated wires having good heat resistance and solderability. In particular, wires coated with a polyimide resin or an imide-modified polyurethane resin are provided. They can each be produced by coating a conductor with an insulating coating composition which contains a polyamic acid represented by the following formula:

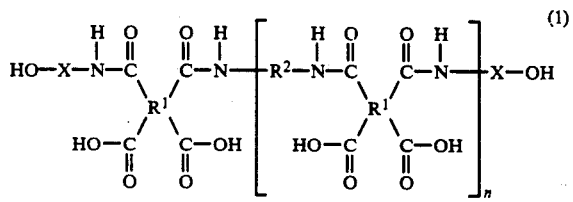

wherein $R^1$ means a particular tetravalent organic group, $R^2$ denotes a specific divalent organic group, X is an alkylene or alkylenephenylene group, and n stands for a positive integer.

22 Claims, 1 Drawing Sheet

INSULATING COATING COMPOSITION, SOLDERABLE INSULATED WIRES, PRODUCTION PROCESS OF THE INSULATED WIRES AND FLYBACK TRANSFORMERS USING THE INSULATED WIRES

BACKGROUND OF THE INVENTION

1) Field of the Invention

This invention relates to insulated wires having excellent heat resistance and good solderability and also to insulating coating compositions. More specifically, the present invention is concerned with insulated wires having a coating of a polyimide resin or an imide-modified polyurethane resin formed on conductors, production processes of the insulated wires, insulating coating compositions and flyback transformers using the insulated wires.

2) Description of the Related Art:

Electrical home appliances such as television sets continue to undergo size and weight reduction. Coupled with this trend, significant size and weight reduction and performance improvements have also been made in connection with electric components such as motors and transformers. There is also a strong demand for improvements to their reliability.

From these standpoints, coating materials having excellent heat resistance are desired as coating materials for insulated wires employed in such electric components. Wires produced by using a polyester resin-base coating composition are used as type B (130° C.) or type F (155° C.) insulated wires. In addition, polyimide resins are also known to have excellent heat resistance.

Wires of smaller diameters are also needed for the size and weight reduction of electric components and for improvements to their performance. Polyester-insulated wires having such smaller diameters are now required to have still higher performance.

These polyester-insulated wires are used in severe environments, so that they are required to have high chemical resistance, solvent resistance, hydrolysis resistance and alkali resistance in addition to good heat resistance and electrical insulation.

Further, rationalization of their production process is also required to reduce the manufacturing cost.

Aspects of this rationalization include rationalization and line operation performance of stripping of insulation from the ends of insulated wires.

Stripping of insulation from the ends of insulated wires is currently done by various methods, including mechanical stripping, thermal decomposition stripping, chemical stripping and solder stripping. Solder stripping is however most preferred in view of the shorter working time, the protection of the conductors of small-diameter wires from damage, the possibility of continuous processing, etc.

Although the stripping of insulation from the ends of wires by a chemical reagent has already been carried out as a line operation, a relatively long time is required for the immersion in the chemical reagent and subsequent washing is indispensable. In addition, there is potential danger in that the chemical reagent must be handled. It has hence been attempted to conduct solder stripping as a line operation. However, none of conventional polyester-insulated wires were solder strippable.

As heat-resistant, insulated wires, there are polyimide-insulated wires [Publication of Unexamined Japanese Patent Application (KOKAI) No. 1-124905]. They however do not offer strippability.

As insulated wires which permit solder stripping, there are wires insulated by a polyurethane coating composed principally of a polyurethane resin as disclosed in Publication of Unexamined Japanese Patent Application (KOKAI) No. 64-90268. Their heat resistance is however as low as type E (120° C.).

There is accordingly a strong demand for the development of insulated wires having a heat-resistant, resin coating whose heat resistance is at least type B (130° C.).

When soldering an insulated wire strand composed of many wires, there is recently an increasing tendency to conduct its end processing in such a way that the insulated wire strand with its insulating coating still applied thereon is directly immersed in a solder bath to achieve simultaneous stripping of the insulating coating, and soldering.

For this purpose, the insulating coating must be removed as promptly as possible after the immersion in the solder bath. Needless to say, the shorter the immersion in the solder bath, the better.

With solder stripping, the temperatures of a molten solder bath higher than 450° C. significantly accelerate oxidative deterioration of the solder bath and the velocity of dissolution of copper as a conductor into the solder. Such high temperatures therefore lead to the problem that the conductors of insulated wires may be reduced in diameter.

Proposed in view of such solder strippability as described above include insulated wires having an insulating coating of a polyester imide resin [Publication of Unexamined Japanese Patent Application (KOKAI) No. 63-289711], polyurethane compositions formed of a polyester imide and an isocyanate [Publication of Unexamined Japanese Patent Application (KOKAI) No. 63-69819], etc. They are however accompanied by the drawbacks that their prices are high because their chemical structures are different and/or they require special raw materials and/or a complex reaction and that they are inferior in electrical insulation because of a high concentration of polar groups. In addition, they also have the potential problem that they may have inferior solderability due to the inclusion of an ester-type crosslinking structure at a high concentration.

SUMMARY OF THE INVENTION

With the foregoing in view, the present invention has been completed to provide with relative ease and at a low price a solderable, insulated wire - which has a coating material having heat resistance of at least type B (130° C.), permits simultaneous stripping of the coating material and soldering at a temperature not higher than 450° C. and has excellent thermal, mechanical, electrical and chemical properties - and an insulating coating composition therefor. A further object of the present invention is to provide a flyback transformer using the above insulated wire.

To achieve the above objects, the present inventors have proceeded with an extensive investigation. As a result, it has been found that an insulated wire capable of meeting the above desires can be obtained by coating a conductor with an insulating coating composition, which contains a polyamic acid or polyimide of a particular chemical structure, or with an insulating coating composition, which contains a polyamic acid of a specific structure and an isocyanate or blocked isocyanate, and then baking the coating composition thus coated, leading to the present invention.

Namely, the present invention relates to a solderable, insulated wire having a polyimide resin coating, which has been produced by coating a conductor with an insulating coating composition, which comprises a polyamic acid represented by the below-described formula (1), and then baking the thus-coated composition.

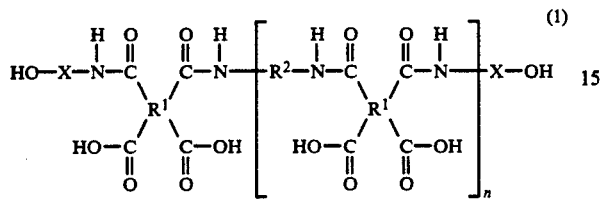

In the above formula (1), X means an alkylene or alkylenephenylene group which becomes a principal chain of a hydroxylamine as an end-capping agent for the polyamic acid. Especially desirably, X is an alkylene group selected from the group consisting of alkylene groups represented by the following formula (12):

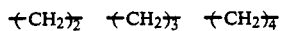    (12)

or an alkylenephenylene group selected from the group consisting of alkylenephenylene groups represented by the following formula (13):

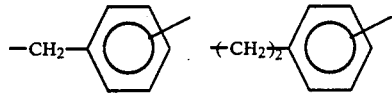    (13)

In the above formula (1), each HO-X- is a monovalent organic group selected from the group consisting of monovalent organic groups represented by the following formula (14):

    (14)

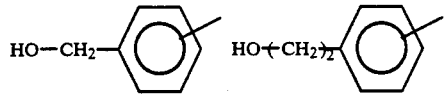

Monoamines containing any one of these groups can be used similarly as end-capping agents.

X has the same meaning in other formulae throughout the present application.

On the other hand, n stands for a positive integer. Desirably, n is at least 5 from the standpoint of the mechanical strength of coatings to be formed. n has the same meaning in the other formulae throughout the present application.

Further, $R^2$ denotes a divalent organic group selected from the group consisting of divalent organic groups represented by the following formulae (3):

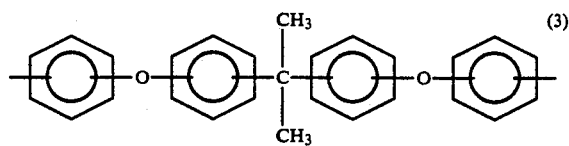    (3)

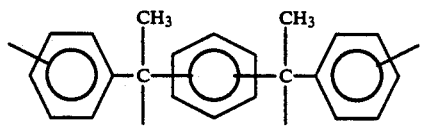

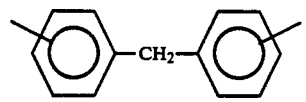

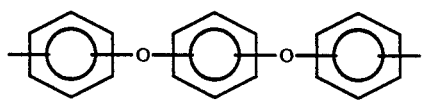

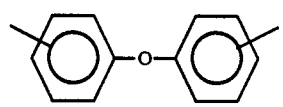

h being an integer of 2–16, and
i and j being individually an integer of 2–10
when $R^1$ is a tetravalent organic group selected from the group consisting of tetravalent organic groups represented by the following formulae (2):

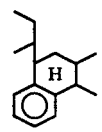    (2)

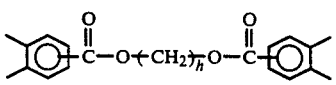

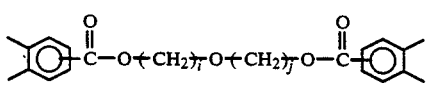

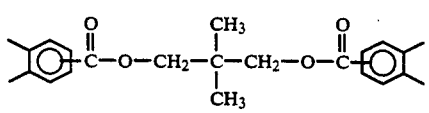

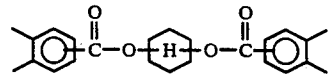

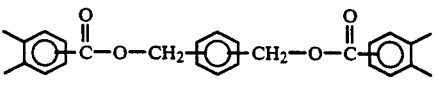

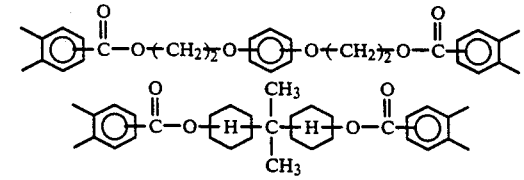

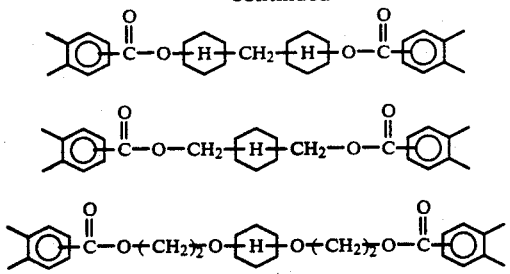
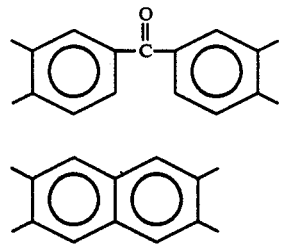

Alternatively, $R^2$ denotes a divalent organic group selected from the group consisting of divalent organic groups represented by the following formula (5):

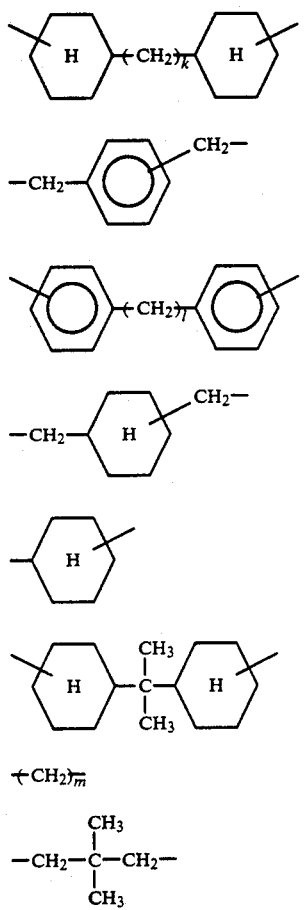

(5)

k being an integer of 1–10, and
l and m being individually an integer of 2–10
when $R^1$ is a tetravalent organic group selected from the group consisting of tetravalent organic groups represented by the following formulae (4):

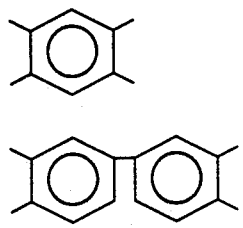

(4)

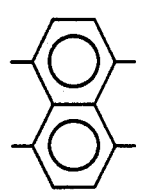
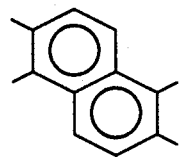
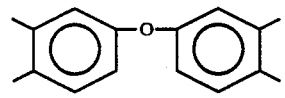
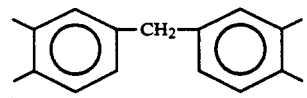
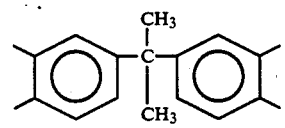

$R^1$ and $R^2$ have the same meanings in the other formulae throughout the present application.

The above insulated wire can be produced in the following manner.

Namely, the present invention also relates a process for the production of a solderable, insulated wire, which comprises:

i) reacting a hydroxylamine represented by the following formula (6):

$$HO-X-NH_2 \qquad (6),$$

a tetracarboxylic dianhydride represented by the following formula (7):

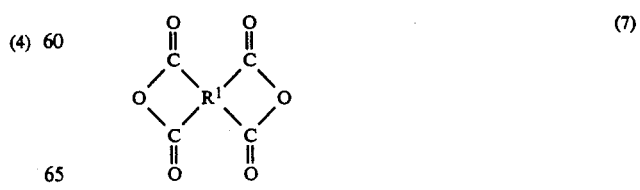

(7)

and a diamine represented by the following formula (8):

$$H_2N-R^2-NH_2 \tag{8}$$

in the presence of an organic solvent to form a polyamic acid represented by the following formula (1):

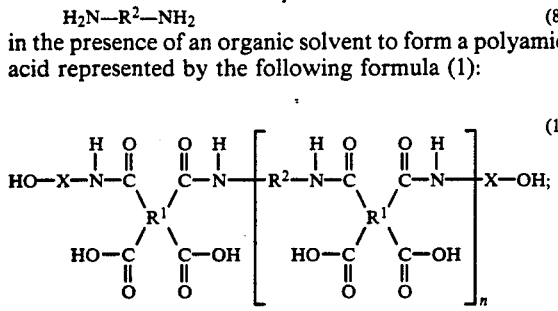

ii) coating a conductor with an insulating coating composition, which comprises the polyamic acid of the formula (1); and iii) baking the thus-coated composition to cause the amide groups and carboxyl groups in the formula (1) to undergo an intramolecular reaction, whereby the polyamic acid of the formula (1) is imidated into a polyimide resin.

The insulated wire according to the present invention has been successfully imparted with both high heat resistance and solderability without impairing electrical, mechanical and chemical properties. It can therefore be used widely with good workability in electrical components which require high heat transformers such as transformers.

The insulating coating composition according to the present invention can be used to coat various conductors as a coating having both high heat resistance and insulating property.

BRIEF DESCRIPTION OF THE DRAWINGS

The above and other objects, features and advantages of the present invention will become apparent from the following description and the appended claims, taken in conjunction of the accompanying drawings, in which:

DETAILED DESCRIPTION OF THE INVENTION AND PREFERRED EMBODIMENTS

The organic solvent employed in the above production process is required to promote the reaction. Examples of the organic solvent include dimethylacetamide, N-methylpyrrolidone, N-methylcaprolactam, dimethyl sulfone, dimethylformamide and dimethyl sulfoxide.

In the above production process, a catalytic amount of a tertiary amine can be added to the insulating coating composition. Illustrative of the tertiary amine include triethylamine, tri-n-butylamine, dimethyldodecylamine, pyridine, 4-isopropylpyridine, N-dimethylbenzylamine, isoquinoline, and N-methylmorpholine. These tertiary amines act not only as imidating catalysts but also as urethanating catalysts.

Figure 1:
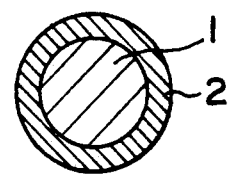
FIG. 1 is a cross-sectional view of an insulated wire according to the present invention.

FIG. 1 is a cross-sectional view of an insulated wire according to the present invention, in which numeral 1 indicates a conductor such as a copper wire. An insulating coating 2 has been formed on the conductor 1 by coating the conductor with an insulating coating composition and then baking the thus-coated composition.

By coating the conductor with the insulating coating composition, which contains the polyamic acid represented by the formula (1), and then baking the thus-coated composition, the amido groups and carboxyl groups in the formula (1) undergo an intramolecular reaction so that the polyamic acid is imidated to form a polyimide resin and, at the same time, the solvent is caused to evaporate. A strong polyimide resin coating is therefore formed on the conductor.

Further, the insulating coating composition containing the polyamic acid represented by the formula (1) may additionally contain a polyimide represented by the following formula (9):

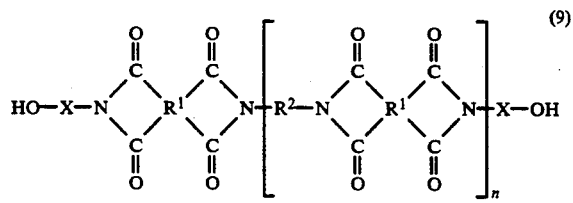

in some instances as intramolecular imidation may take place under certain conditions such as a high reaction temperature in the course of the synthesis of the polyamic acid.

As an alternative, the imidation may be allowed to proceed in advance of the coating of the conductor with the coating composition so that the coating composition can contain the polyimide represented by the formula (9). In this case, it is desirable to add an imidating catalyst to the organic solvent upon the synthetic reaction of the polyamic acid. Examples of the imidating catalyst include the above-described tertiary amines and the like.

Namely, this invention also relates to a solderable, insulated wire having a polyimide resin coating, which has been produced by coating a conductor with an insulating coating composition, said composition comprising a polyimide represented by the following formula (9):

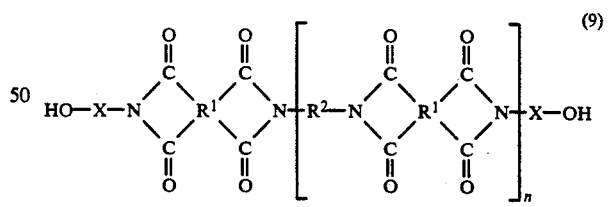

and then baking the thus-coated composition.

As a process for the production of the insulated wire described above, the present invention also relates to a process for the production of a solderable, insulated wire, which comprises:

i) reacting a hydroxylamine represented by the following formula (6):

$$HO-X-NH_2 \tag{6},$$

a tetracarboxylic dianhydride represented by the following formula (7):

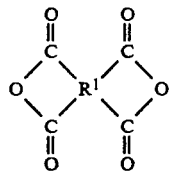
 (7)

and a diamine represented by the following formula (8):

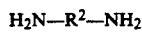
 (8)

in the presence of an organic solvent to form a polyimide represented by the following formula (9):

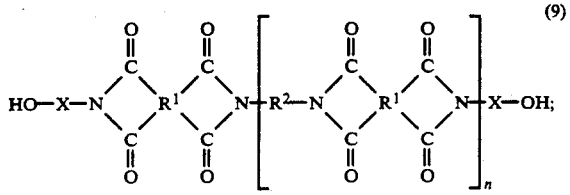
 (9)

ii) coating a conductor with an insulating coating composition, which comprises the polyimide of the formula (9); and iii) baking the thus-coated composition.

Here, the formation of the polyimide can be conducted, for example, by adding an imidating catalyst or raising the reaction temperature.

This invention also relates to a solderable, insulated wire having a coating of an imidated polyurethane resin, which has been formed by coating a conductor with an insulating coating composition, said composition comprising a polyamic acid represented by the formula (1):

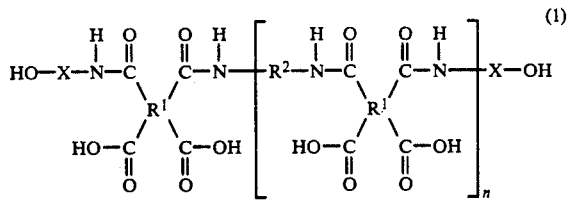
 (1)

and an isocyanate or blocked isocyanate, and then baking the thus-coated composition.

The formation of the imidated polyurethane resin coating makes use of the fact that the imidated polyurethane is formed by reacting the two end hydroxyl groups of the polyamic acid, which is represented by the formula (1), as a polyol with the isocyanate. The above-described, insulated wire having the imidated polyurethane resin coating can be produced by a process to be described next.

Namely, the present invention also relates to a process for the production of a solderable, insulated wire, which comprises coating a conductor with an insulating coating composition—said composition comprising a polyamic acid represented by the formula (1):

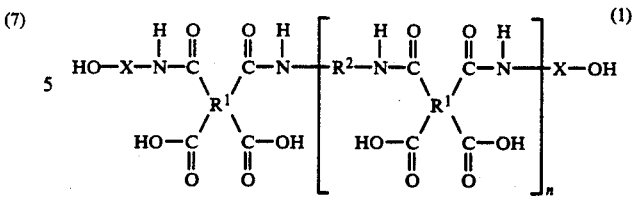
 (1)

and an isocyanate or blocked isocyanate in such proportions that 0.4–2.0 equivalents of isocyanate groups are contained per equivalent of the end hydroxyl groups of the polyamic acid—and then baking the thus-coated composition, whereby the amido groups and carboxyl groups of the polyamic acid undergo an intramolecular reaction to imidate the polyamic acid and the end hydroxyl groups react the isocyanate or blocked isocyanate groups to form an imidated polyurethane resin.

As long as the equivalent ratio of end hydroxyl groups to isocyanate groups falls within the range specified above, the urethanation reaction can be brought to completion so that the resultant coating layer has various good properties. In particular, the existence of 0.9–1.1 equivalents of isocyanates groups is preferred.

The isocyanate can be either a diisocyanate or a triisocyanate. Examples of the isocyanate therefore include phenylene diisocyanate, toluylene diisocyanate, 1-ethylbenzene-2,4-diisocyanate, diphenylmethane diisocyanate, 1-isopropylbenzene-2,4-diisocyanate, 1-chlorobenzene-2,4-diisocyanate, xylylene diisocyanate, 1-nitrobenzene-2,4-diisocyanate, isophorone diisocyanate, 1-methoxybenzene-2,4-diisocyanate, naphthalene diisocyanate, dimethylbiphenyl diisocyanate, 1-methylbenzene-2,4,6-triisocyanate, triphenylmethane triisocyanate, 1,3,5-trimethylbenzene-2,4,6-triisocyanate, naphthalene-1,3,7-triisocyanate, biphenyl-2,4,4-triisocyanate, and hexamethylene diisocyanate.

Examples of the polyisocyanate include low molecular isocyanates having a molecular weight of 100–400 or so, especially urethane-bond-containing polyisocyanates obtained by reacting diisocyanates with low molecular polyols having a molecular weight of 60–200 or so, such as trimethylolpropane, hexanetriol and butanediol, either singly or in combination.

In addition, illustrative of the blocked isocyanate include compounds obtained by individual block polymerization of all the isocyanates described above. Usable examples of blocked isocyanates include those obtained by individually block-polymerizing diisocyanate and triisocyanate compounds, which have a molecular weight of 300–10,000 or so, and polyfunctional isocyanates, which contains two or more isocyanate groups per molecule like polyisocyanate compounds, with blocking agents, for example, compounds containing one or more active hydrogen atoms, e.g., phenols such as phenol, cresol, xylenol and chlorophenol, oximes such as methyl ethyl ketone oxime, primary, secondary and tertiary monoalcohols, and caprolactams by a method known per se in the art. Also usable are those obtained by reacting the above polyfunctional isocyanate compounds with polyhydric alcohols, such as trimethylolpropane, hexanetriol and glycerin, so that the polyfunctional isocyanate compounds can be block-polymerized. Typical commercial products of blocked isocyanates, which can be used in the present invention, include "Colonate AP Staple", "Colonate 2503", "Colonate 2515" and "Millionate MS-50" (trade names;

products of Nippon Polyurethane Industry Co., Ltd.); as well as "Desmodule AP-12 Staple" and "Desmodule CT Staple" (trade names; products of Sumitomo Bayer Urethane Co., Ltd.).

Upon formation of the above-described imidated polyurethane resin coating, a tertiary amine can be added as an imidating catalyst to the insulating coating composition. The tertiary amine also acts as a catalyst for the urethanation reaction.

This invention also relates to a solderable, insulated wire having a coating of a polyimide resin represented by the following formula (10):

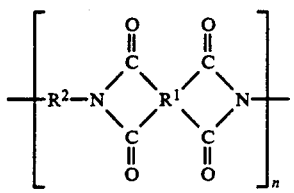
(10)

As a process for forming this insulating coating, this invention also relates to a process for the production of a solderable, insulated wire, which comprises:

i) reacting a tetracarboxylic dianhydride represented by the following formula (7):

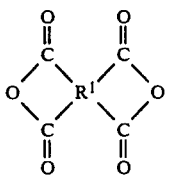
(7)

and a diamine represented by the following formula (8):

$H_2N-R^2-NH_2$ (8)

in the presence of an organic solvent to form a polyamic acid represented by the following formula (11):

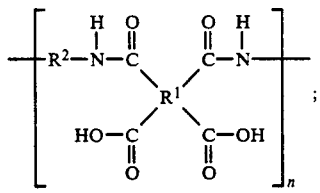
(11)

ii) coating a conductor with an insulating coating composition, which comprises the polyamic acid of the formula (11); and iii) baking the thus-coated composition, whereby the amido groups and carboxyl groups in the formula (11) are caused to undergo an intramolecular reaction and the polyamic acid of the formula (11) is imidated into a polyimide resin.

The organic solvent is similar to that described above. The insulating coating composition can contain a catalytic amount of a tertiary amine as an imidating catalyst.

In the above formulae (10) and (11), n stands for a positive integer, with 5 or greater being desired.

The insulated wire having a coating of the polyimide resin represented by the formula (10) can also be produced by coating a conductor with an insulating coating composition, which contains the polyimide represented by the formula (10), and then baking the thus-coated composition.

Namely, this invention is also concerned with a process for the production of a solderable, insulated wire, which comprises:

i) reacting a tetracarboxylic dianhydride represented by the following formula (7):

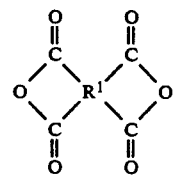
(7)

and a diamine represented by the following formula (8):

$H_2N-R^2-NH_2$ (8)

in the presence of an organic solvent to form a polyamic acid represented by the following formula (11):

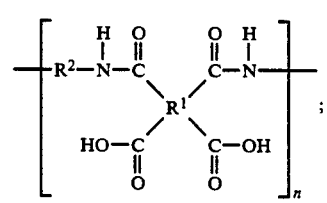
(11)

ii) imidating the polyamic acid to form a polyimide represented by the following formula (10):

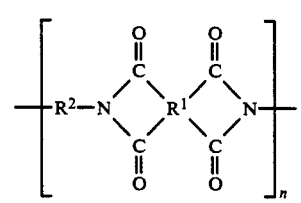
(10)

iii) coating a conductor with an insulating coating composition, which comprises the polyimide of the formula (10); and iv) baking the thus-coated composition.

The imidation can be effected by the addition of an imidating catalyst or by heating the polyamic acid. Examples of the imidating catalyst include the tertiary amines described above.

When an insulating coating composition contains a polyimide as described above, coating of a conductor with the coating composition and subsequent baking of the coating composition so coated cause the solvent to evaporate so that a strong insulating coating is formed.

A solderable, insulated wire of the present invention, which makes use of any one of the insulating coating compositions described above, can be provided by coating a conductor with the above insulating coating composition to a thickness sufficient to give a desired, baked coating thickness and then baking the thus-coated composition in a conventional bake-coating oven.

The conductor usable here is, for example, a copper, silver or stainless steel wire. The diameter of each conductor to which the present invention is applicable can be of any size, ranging from an extremely small-diameter wire to a large-diameter wire. It is therefore to be noted that the conductor is not limited to any conductor of any particular diameter. Generally, the present invention is primarily applied to copper wires whose diameters range from about 0.030 mm to about 2.0 mm.

The formation of an insulating coating on the conductor can be carried out following any one of the methods known to date. A desired insulating coating can be formed, for example, by coating a conductor with an insulating coating composition in accordance with a suitable coating method such as felt coating or die coating and then successively passing the thus-coated conductor several to several tens times for about 3-100 seconds each time through a baking furnace of 300°-500° C. Namely, the desired insulating coating can be obtained by baking the coating composition at a temperature for a time sufficient to substantially complete the curing reaction of the coating composition. The thicknesses of insulating coatings are the coating thicknesses specified in standards such as JIS, NEMA or IEC.

Incidentally, insulating coating compositions usable for the formation of insulated wires according to the present invention can be used to form an insulating coating not only on electric wires but also on various other conductors.

Further, the present invention also provides flyback transformers making use of the insulated wires described above.

Each insulating coating composition according to the present invention contains a polyamic acid or polyimide having a particular chemical structure or a polyamic acid of a particular chemical structure in combination with an isocyanate or blocked isocyanate. The polyimide resin or imidated polyurethane resin, which is formed by coating a conductor with the insulating coating composition and then baking the composition, has excellent thermal, mechanical, electrical and chemical properties. An insulated wire having the polyimide resin or imidated polyurethane resin as a coating has heat resistance of at least 130° C. and good solderability.

The present invention will hereinafter be described in detail in the following examples. It is however to be noted that the present invention is not limited to them.

In the following examples and comparative examples, raw materials employed for the formation of insulating coatings are designated by their corresponding abbreviations. The abbreviations have the following meanings:

a) Hydroxylamines represented by the following formula (6):

$$HO-X-NH_2 \quad (6)$$

include p-aminobenzyl alcohol (abbreviation S) of the following formula (15):

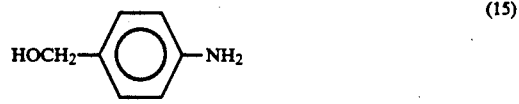

(15)

b) The tetracarboxylic dianhydride represented by the following formula (7):

(7)

and the diamine represented by the following formula (8):

$$H_2N-R^2-NH_2 \quad (8)$$

can be combined in the following two ways. Namely,

1. The above diamine can preferably be any one of the compounds of the below-described abbreviations ($B_1-B_5$) when the tetracarboxylic dianhydride is any one of the below-described abbreviations ($A_1-A_8$); and 2. The above diamine can preferably be any one of the compounds of the below-described abbreviations ($B_6-B_{13}$) when the tetracarboxylic dianhydride is any one of the below-described abbreviations ($A_9-A_{17}$).

The following 17 compounds were used as typical tetracarboxylic dianhydrides:

Abbreviation $A_1$:

1,3,3a,4,5,9b-Hexahydro-5-(tetrahydro-2,5-dioxo-3-franyl)-naphtho[1,2-C]furan-1,3-dione of the following formula (16):

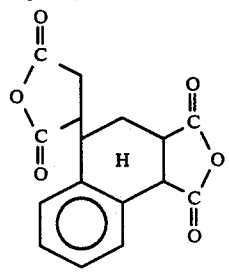

(16)

Abbreviation $A_2$:

Ethylene glycol bis(anhydrotrimellitate) of the following formula (17):

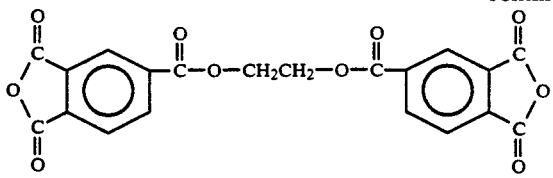
(17)

Abbreviation A₃:
Tetramethylene glycol bis(anhydrotrimellitate) of the following formula (18):

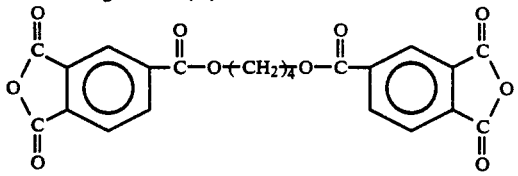
(18)

Abbreviation A₄:
Diethylene glycol bis(anhydrotrimellitate) of the following formula (19):

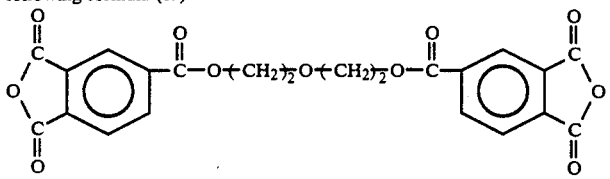
(19)

Abbreviation A₅:
Neopentyl glycol bis(anhydrotrimellitate) of the following formula (20):

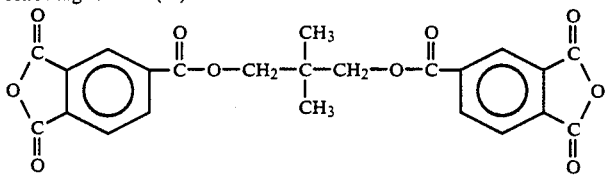
(20)

Abbreviation A₆:
1,4-Cyclohexanediol bis(anhydrotrimellitate) of the following formula (21):

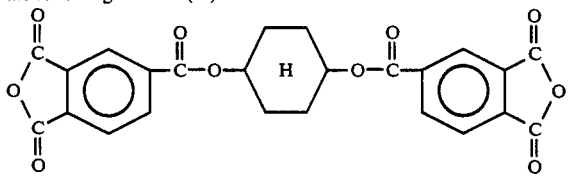
(21)

Abbreviation A₇:
p-Xylylene glycol bis(anhydrotrimellitate) of the following formula (22):

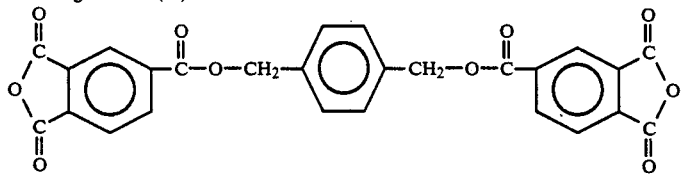
(22)

Abbreviation A₈:
Hydroquinone-di-(β-hydroxyethyl) ether bis(anhydrotrimellitate) of the following formula (23):

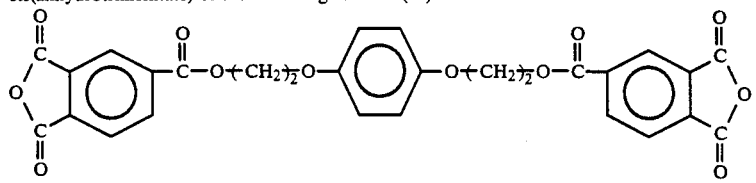
(23)

Abbreviation A₉:
Pyromellitic dianhydride of the following formula (24):

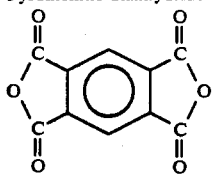
(24)

Abbreviation A₁₀:
3,3',4,4'-Diphenyltetracarboxylic dianhydride of the following formula (25):

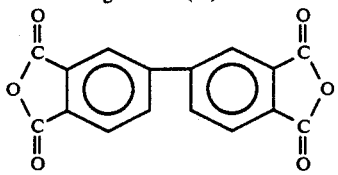
(25)

Abbreviation A₁₁:
3,3',4,4'-Benzophenonetetracarboxylic dianhydride of the following formula (26):

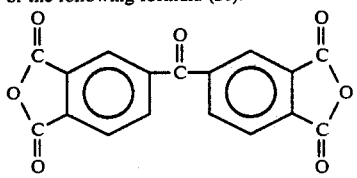
(26)

Abbreviation A₁₂:
2,3,6,7-Naphthalenetetracarboxylic dianhydride of the following formula (27):

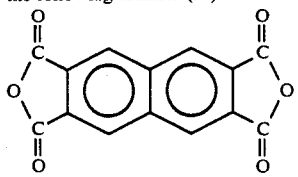
(27)

Abbreviation A₁₃:
1,4,5,8-Naphthalenetetracarboxylic dianhydride of the following formula (28):

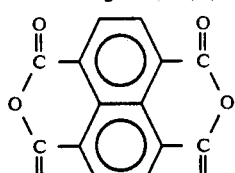
(28)

Abbreviation A₁₄:
1,2,5,6-Naphthalenetetracarboxylic dianhydride of the following formula (29):

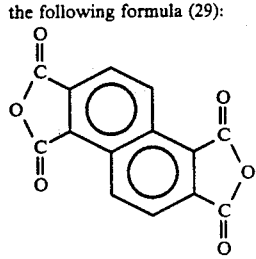
(29)

Abbreviation A₁₅:
3,3',4,4'-Diphenyl ether tetracarboxylic dianhydride of the following formula (30):

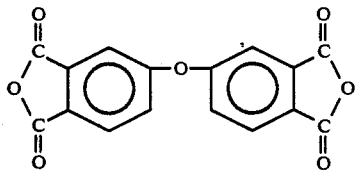

(30)

Abbreviation A₁₆:
3,3'4,4'-Diphenylmethanetetracarboxylic dianhydride of the following formula (31):

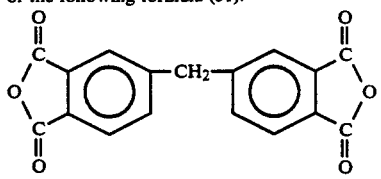

(31)

Abbreviation A₁₇:
3,3'4,4'-Diphenylpropanetetracarboxylic dianhydride of the following formula (32):

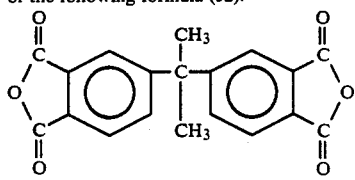

(32)

The following 13 compounds were used as typical diamines:

Abbreviation B₁:
2,2-Bis[4-(4'-aminophenoxy)phenyl]propane of the following formula (33):

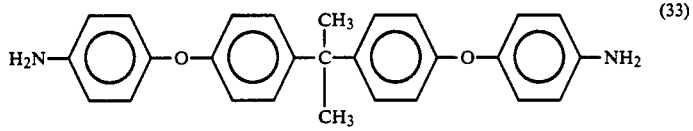

(33)

Abbreviation B₂:
1,3-Bis[2-(4'-aminophenyl)propyl]benzene of the following formula (34):

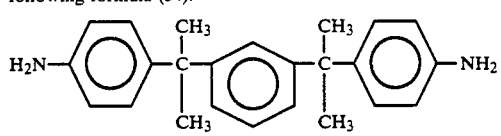

(34)

Abbreviation B₃:
4,4'-Diaminodiphenylmethane of the following formula (35):

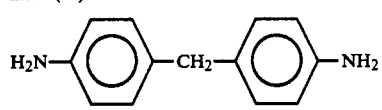

(35)

Abbreviation B₄:
1,3-Bis(4-aminophenoxy)benzene of the following formula (36):

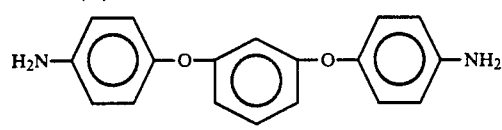

(36)

Abbreviation B₅:
4,4'-Diaminodiphenyl ether of the following formula (37):

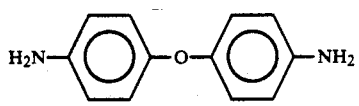
(37)

Abbreviation B₆:
4,4'-Diaminodicyclohexylmethane of the following formula (38):

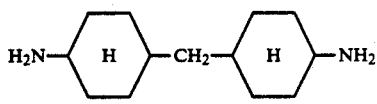
(38)

Abbreviation B₇:
1,4-Di(aminomethyl)benzene of the following formula (39):

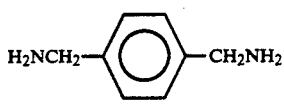
(39)

Abbreviation B₈:
4,4'-Diaminodiphenylpropane of the following formula (40):

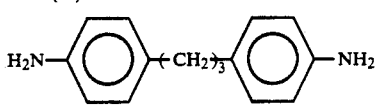
(40)

Abbreviation B₉:
1,4-Di(aminomethyl)cyclohexane of the following formula (41):

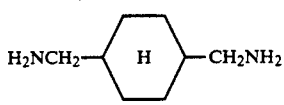
(41)

Abbreviation B₁₀:
1,4-Diaminocyclohexane of the following formula (42):

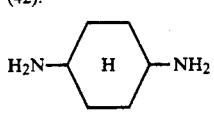
(42)

Abbreviation B₁₁:
4,4'-Diaminodicyclohexylpropane of the following formula (43):

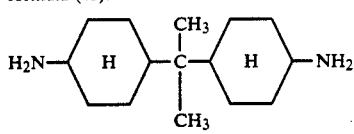
(43)

Abbreviation B₁₃:
Hexamethylenediamine of the following formula (44):

(44)

Abbreviation B₁₄:
2,2-Dimethylpropylenediamine of the following formula (45):

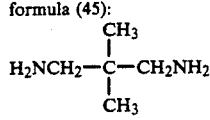
(45)

c) The following two compounds were used as typical tertiary amines which acted as imidating catalysts:
Abbreviation C₁: Dimethyldodecylamine.
Abbreviation C₂: N-Dimethylbenzylamine.

Further, "Desmodule CT Staple" (trade name; product of Sumitomo Bayer Urethane Co., Ltd.) was used as a blocked isocyanate for a urethanation reaction, diphenylmethane diisocyanate as an isocyanate, and a 1:1 (by weight) mixed solvent of dimethylacetamide (DMAc) and N-methylpyrrolidone (NMP) as an organic solvent for the formation of polyamic acid.

EXAMPLE 1

Diamine $B_1$ (6.15 g, 0.015 mol), solvent DMAc (40 g) and NMP (40 g) were charged in a reaction flask fitted with a stirrer, a thermometer and a nitrogen inlet tube. While they were maintained at 25° C. under a nitrogen gas stream, they were thoroughly stirred. To the resultant solution, were gradually added acid dianhydride $A_1$ (4.95 g, 0.0165 mol) and hydroxylamine S (0.369 g, 0.003 mol). After their addition was completed, the reaction mixture was continuously stirred at 25° C. for 12 hours under a nitrogen gas stream so that a polyamic acid was synthesized.

A copper wire whose diameter was 0.4 mm was coated with a coating composition (polyamic acid solution) so prepared. The thus-coated copper wire was passed several times at a feeding speed of 10 m/min through an oven which was controlled at 370° C. and was 3.0 m long, whereby baking was conducted to obtain an insulated wire having a coating of about 20 μm thick. In an infrared absorption spectrum of the coating, absorption by imido groups was observed at 1780 cm$^{-1}$ and 1380 cm$^{-1}$.

The wire thus obtained was evaluated in accordance with the testing method for enameled copper wires and enameled aluminum wires (JIS C3003-1984). The evaluation results are shown in Table 1.

EXAMPLE 2

A polyamic acid was synthesized in a similar manner to Example 1 except that diamine $B_2$ (6.192 g, 0.018 mol), solvent DMAc (40 g), NMP (40 g), acid dianhydride $A_1$ (5.85 g, 0.0195 mol) and hydroxylamine S (0.369 g, 0.003 mol) were used.

Using a coating composition (polyamic acid solution) so prepared, a polyimide-insulated wire according to the present invention was obtained as in Example 1. The wire was evaluated in a similar manner to Example 1.

The evaluation results are shown in Table 1.

EXAMPLE 3

A polyamic acid was synthesized in a similar manner to Example 1 except that diamine $B_1$ (6.15 g, 0.015 mol), solvent DMAc (40 g), NMP (40 g), acid dianhydride $A_2$ (6.765 g, 0.0165 mol) and hydroxylamine S (0.369 g, 0.003 mol) were used.

Using a coating composition (polyamic acid solution) so prepared, a polyimide-insulated wire according to the present invention was obtained as in Example 1. The wire was evaluated in a similar manner to Example 1.

The evaluation results are shown in Table 1.

EXAMPLE 4

A polyamic acid was synthesized in a similar manner to Example 1 except that diamine $B_2$ (7.224 g, 0.021 mol), solvent DMAc (60 g), NMP (60 g), acid dianhydride $A_2$ (9.225 g, 0.0225 mol) and hydroxylamine S (0.369 g, 0.003 mol) were used.

Using a coating composition (polyamic acid solution) so prepared, a polyimide-insulated wire according to the present invention was obtained as in Example 1. The wire was evaluated in a similar manner to Example 1.

The evaluation results are shown in Table 1.

EXAMPLE 5

A polyamic acid was synthesized in a similar manner to Example 1 except that diamine $B_1$ (6.15 g, 0.015 mol), solvent DMAc (60 g), NMP (60 g), acid dianhydride $A_2$ (6.76 g, 0.0165 mol), hydroxylamine S (0.369 g, 0.003 mol) and tertiary amine $C_1$ (0.06 g) were used.

Using a coating composition (polyamic acid solution) so prepared, a polyimide-insulated wire according to the present invention was obtained as in Example 1. The wire was evaluated in a similar manner to Example 1.

The evaluation results are shown in Table 1.

EXAMPLE 6

A polyamic acid was synthesized in a similar manner to Example 1 except that diamine $B_1$ (3.69 g, 0.009 mol), solvent DMAc (30 g), NMP (30 g), acid dianhydride $A_2$ (4.305 g, 0.0105 mol) and hydroxylamine S (0.369 g, 0.003 mol) were used.

Using a coating composition (polyamic acid solution) so prepared, a polyimide-insulated wire according to the present invention was obtained as in Example 1. The wire was evaluated in a similar manner to Example 1.

The evaluation results are shown in Table 1.

EXAMPLE 7

Diphenylmethane diisocyanate was added to the polyamic acid solution of Example 6 at a ratio such that 1 equivalent of isocyanate groups was contained per equivalent of end hydroxyl groups of the polyamic acid, whereby a coating composition was obtained.

Using the coating composition thus obtained, an imidated-polyurethane-insulated wire according to the present invention was obtained as in Example 1. The wire was evaluated in a similar manner to Example 1.

The evaluation results are shown in Table 1.

EXAMPLE 8

A polyamic acid was synthesized in a similar manner to Example 1 except that diamine $B_1$ (6.15 g, 0.015 mol), solvent DMAc (40 g), NMP (40 g) and acid dianhydride $A_2$ (6.15 g, 0.015 mol) were used and hydroxylamine S was omitted.

Using a coating composition (polyamic acid solution) so prepared, a polyimide-insulated wire according to the present invention was obtained as in Example 1. The wire was evaluated in a similar manner to Example 1.

The evaluation results are shown in Table 1.

EXAMPLE 9

A polyamic acid was synthesized in a similar manner to Example 1 except that diamine $B_2$ (6.88 g, 0.02 mol), solvent DMAc (40 g), NMP (40 g) and acid dianhydride $A_1$ (6.00 g, 0.02 mol) were used and hydroxylamine S was omitted.

Using a coating composition (polyamic acid solution) so prepared, a polyimide-insulated wire according to the present invention was obtained as in Example 1. The wire was evaluated in a similar manner to Example 1.

The evaluation results are shown in Table 1.

EXAMPLE 10

A polyamic acid was synthesized in a similar manner to Example 1 except that diamine $B_4$ (5.84 g, 0.02 mol), solvent DMAc (50 g), NMP (50 g) and acid dianhydride $A_2$ (8.2 g, 0.02 mol) were used and hydroxylamine S was omitted.

Using a coating composition (polyamic acid solution) so prepared, a polyimide-insulated wire according to the present invention was obtained as in Example 1. The wire was evaluated in a similar manner to Example 1.

The evaluation results are shown in Table 1.

EXAMPLE 11

A polyamic acid was synthesized in a similar manner to Example 1 except that diamine $B_5$ (4 g, 0.02 mol), solvent DMAc (40 g), NMP (40 g) and acid dianhydride $A_2$ (8.2 g, 0.02 mol) were used and hydroxylamine S was omitted.

Using a coating composition (polyamic acid solution) so prepared, a polyimide-insulated wire according to the present invention was obtained as in Example 1. The wire was evaluated in a similar manner to Example 1.

The evaluation results are shown in Table 1.

EXAMPLE 12

Diamine $B_3$ (3.96 g, 0.02 mol), solvent DMAc (40 g) and NMP (40 g) were charged in a reaction flask fitted with a stirrer, a thermometer and a nitrogen inlet tube. While they were maintained at 25° C. under a nitrogen gas stream, they were thoroughly stirred. To the resultant solution, were gradually added acid dianhydride $A_2$ (9.225 g, 0.0225 mol) and hydroxylamine S (0.615 g, 0.005 mol). After their addition was completed, the reaction mixture was continuously stirred at 25° C. for 14 hours under a nitrogen gas stream so that a polyamic acid was synthesized.

A copper wire whose diameter was 0.4 mm was coated with a coating composition (polyamic acid solution) so prepared. The thus-coated copper wire was passed several times at a feeding speed of 10 m/min through an oven which was controlled at 380° C. and was 3.0 m long, whereby baking was conducted to obtain an insulated wire having a coating of about 20 μm thick. In an infrared absorption spectrum of the coating, absorption by imido groups was observed at 1780 cm$^{-1}$ and 1380 cm$^{-1}$.

The wire thus obtained was evaluated in accordance with the testing method for enameled copper wires and enameled aluminum wires (JIS C3003-1984). The evaluation results are shown in Table 2.

EXAMPLE 13

A polyamic acid was synthesized in a similar manner to Example 12 except that diamine $B_3$ (3.168 g, 0.016 mol), solvent DMAc (40 g), NMP (40 g), acid dianhydride $A_2$ (6.97 g, 0.017 mol) and hydroxylamine S (0.246 g, 0.002 mol) were used.

Using a coating composition (polyamic acid solution) so prepared, a polyimide-insulated wire according to the present invention was obtained as in Example 12. The wire was evaluated in a similar manner to Example 1.

The evaluation results are shown in Table 2.

EXAMPLE 14

A polyamic acid was synthesized in a similar manner to Example 12 except that diamine $B_3$ (4.95 g, 0.025 mol), solvent DMAc (60 g), NMP (60 g), acid dianhydride $A_2$ (10.66 g, 0.026 mol) and hydroxylamine S (0.246 g, 0.002 mol) was used.

Using a coating composition (polyamic acid solution) so prepared, a polyimide-insulated wire according to the present invention was obtained as in Example 12. The wire was evaluated in a similar manner to Example 1.

The evaluation results are shown in Table 2.

EXAMPLE 15

A polyamic acid was synthesized in a similar manner to Example 12 except that diamine $B_3$ (2.97 g, 0.015 mol), solvent DMAc (30 g), NMP (30 g), acid dianhydride $A_2$ (6.56 g, 0.016 mol), hydroxylamine S (0.246 g, 0.002 mol) and tertiary amine $C_2$ (0.045 g) were used.

Using a coating composition (polyamic acid solution) so prepared, a polyimide-insulated wire according to the present invention was obtained as in Example 12. The wire was evaluated in a similar manner to Example 1.

The evaluation results are shown in Table 2.

EXAMPLE 16

A polyamic acid was synthesized in a similar manner to Example 12 except that diamine $B_3$ (3.564 g, 0.018 mol), solvent DMAc (40 g), NMP (40 g), acid dianhydride $A_2$ (8.61 g, 0.021 mol) and hydroxylamine S (0.738 g, 0.006 mol) were used.

It was the polyamic acid of the formula (1) in which n=6.

Using a coating composition (polyamic acid solution) so prepared, a polyimide-insulated wire according to the present invention was obtained as in Example 12. The wire was evaluated in a similar manner to Example 1.

The evaluation results are shown in Table 2.

EXAMPLE 17

A polyamic acid was synthesized in a similar manner to Example 12 except that diamine $B_3$ (4.158 g, 0.021 mol), solvent DMAc (50 g), NMP (50 g), acid dianhydride $A_2$ (9.84 g, 0.024 mol) and hydroxylamine S (0.738 g, 0.006 mol) were used.

The resultant reaction mixture was reacted further at 200° C. for 3 hours, whereby imidation was effected. This was confirmed by an infrared absorption spectrum as in Example 12.

Using a coating composition (polyamic acid solution) so prepared, a polyimide-insulated wire according to the present invention was obtained as in Example 12. The wire was evaluated in a similar manner to Example 1.

The evaluation results are shown in Table 2.

EXAMPLE 18

Diphenylmethane diisocyanate was added to the polyamic acid solution of Example 16 at a ratio such that 1 equivalent of isocyanate groups was contained per equivalent of end hydroxyl groups of the polyamic acid, whereby a coating composition was obtained.

Using the coating composition thus obtained, an imidated-polyurethane-insulated wire according to the present invention was obtained as in Example 12. The wire was evaluated in a similar manner to Example 1.

The evaluation results are shown in Table 2.

EXAMPLE 19

A polyamic acid was synthesized in a similar manner to Example 12 except that diamine $B_3$ (3.96 g, 0.02 mol), solvent DMAc (40 g), NMP (40 g) and acid dianhydride $A_2$ (8.2 g, 0.02 mol) were used and hydroxylamine S was omitted.

Using a coating composition (polyamic acid solution) so prepared, a polyimide-insulated wire according to the present invention was obtained as in Example 12.

The wire was evaluated in a similar manner to Example 1.

The evaluation results are shown in Table 2.

EXAMPLE 20

A polyamic acid was synthesized in a similar manner to Example 12 except that diamine $B_3$ (5.94 g, 0.03 mol), solvent DMAc (60 g), NMP (60 g) and acid dianhydride $A_2$ (12.3 g, 0.03 mol) were used. The reaction mixture was reacted further at 210° C. for 4 hours to effect imidation. This was confirmed by an infrared absorption spectrum as in Example 12.

Using a coating composition (the above solution) so prepared, a polyimide-insulated wire according to the present invention was obtained as in Example 12. The wire was evaluated in a similar manner to Example 1.

The evaluation results are shown in Table 2.

EXAMPLE 21

Diamine $B_2$ (6.88 g, 0.02 mol), solvent DMAc (50 g) and NMP (50 g) were charged in a reaction flask fitted with a stirrer, a thermometer and a nitrogen inlet tube. While they were maintained at 25° C. under a nitrogen gas stream, they were thoroughly stirred. To the resultant solution, were gradually added acid dianhydride $A_3$ (8.979 g, 0.0205 mol) and hydroxylamine S (0.123 g, 0.001 mol). After their addition was completed, the reaction mixture was continuously stirred at 25° C. for 15 hours under a nitrogen gas stream so that a polyamic acid was synthesized.

A copper wire whose diameter was 0.4 mm was coated with a coating composition (polyamic acid solution) so prepared. The thus-coated copper wire was passed several times at a feeding speed of 10 m/min through an oven which was controlled at 370° C. and was 3.0 m long, whereby baking was conducted to obtain an insulated wire having a coating of about 20 μm thick. In an infrared absorption spectrum of the coating, absorption by imido groups was observed at 1780 $cm^{-1}$ and 1380 $cm^{-1}$.

The wire thus obtained was evaluated in accordance with the testing method for enameled copper wires and enameled aluminum wires (JIS C3003-1984). The evaluation results are shown in Table 3.

EXAMPLE 22

A polyamic acid was synthesized in a similar manner to Example 21 except that diamine $B_5$ (3.2 g, 0.016 mol), solvent DMAc (40 g), NMP (40 g), acid dianhydride $A_4$ (7.49 g, 0.0165 mol) and hydroxylamine S (0.123 g, 0.001 mol) were used.

Using a coating composition (polyamic acid solution) so prepared, a polyimide-insulated wire according to the present invention was obtained as in Example 21. The wire was evaluated in a similar manner to Example 1.

The evaluation results are shown in Table 3.

EXAMPLE 23

A polyamic acid was synthesized in a similar manner to Example 21 except that diamine $B_4$ (5.84 g, 0.02 mol), solvent DMAc (50 g), NMP (50 g), acid dianhydride $A_5$ (9.266 g, 0.0205 mol) and hydroxylamine S (0.123 g, 0.001 mol) were used.

Using a coating composition (polyamic acid solution) so prepared, a polyimide-insulated wire according to the present invention was obtained as in Example 21. The wire was evaluated in a similar manner to Example 1.

The evaluation results are shown in Table 3.

EXAMPLE 24

A polyamic acid was synthesized in a similar manner to Example 21 except that diamine $B_3$ (5.94 g, 0.03 mol), solvent DMAc (70 g), NMP (70 g), acid dianhydride $A_6$ (14.152 g, 0.0305 mol) and hydroxylamine S (0.123 g, 0.001 mol) were used.

Using a coating composition (polyamic acid solution) so prepared, a polyimide-insulated wire according to the present invention was obtained as in Example 21. The wire was evaluated in a similar manner to Example 1.

The evaluation results are shown in Table 3.

EXAMPLE 25

A polyamic acid was synthesized in a similar manner to Example 21 except that diamine $B_5$ (5.2 g, 0.026 mol), solvent DMAc (65 g), NMP (65 g), acid dianhydride $A_7$ (12.879 g, 0.0265 mol) and hydroxylamine S (0.123 g, 0.001 mol) were used.

Using a coating composition (polyamic acid solution) so prepared, a polyimide-insulated wire according to the present invention was obtained as in Example 21. The wire was evaluated in a similar manner to Example 1.

The evaluation results are shown in Table 3.

EXAMPLE 26

A polyamic acid was synthesized in a similar manner to Example 21 except that diamine $B_4$ (6.424 g, 0.022 mol), solvent DMAc (65 g), NMP (65 g), acid dianhydride $A_8$ (12.285 g, 0.0225 mol) and hydroxylamine S (0.123 g, 0.001 mol) were used.

Using a coating composition (polyamic acid solution) so prepared, a polyimide-insulated wire according to the present invention was obtained as in Example 21. The wire was evaluated in a similar manner to Example 1.

The evaluation results are shown in Table 3.

EXAMPLE 27

A polyamic acid was synthesized in a similar manner to Example 21 except that diamine $B_5$ (4.0 g, 0.02 mol), solvent DMAc (45 g), NMP (45 g), acid dianhydride $A_3$ (8.979 g, 0.0205 mol) and hydroxylamine S (0.123 g, 0.001 mol) were used.

Using a coating composition (polyamic acid solution) so prepared, a polyimide-insulated wire according to the present invention was obtained as in Example 21. The wire was evaluated in a similar manner to Example 1.

The evaluation results are shown in Table 3.

EXAMPLE 28

A polyamic acid was synthesized in a similar manner to Example 21 except that diamine $B_4$ (5.84 g, 0.02 mol), solvent DMAc (50 g), NMP (50 g), acid dianhydride $A_3$ (8.979 g, 0.0205 mol) and hydroxylamine S (0.123 g, 0.001 mol) were used.

Using a coating composition (polyamic acid solution) so prepared, a polyimide-insulated wire according to the present invention was obtained as in Example 21. The wire was evaluated in a similar manner to Example 1.

The evaluation results are shown in Table 3.

EXAMPLE 29

A polyamic acid was synthesized in a similar manner to Example 21 except that diamine $B_4$ (5.84 g, 0.02 mol), solvent DMAc (50 g), NMP (50 g), acid dianhydride $A_3$ (8.979 g, 0.0205 mol), hydroxylamine S (0.123 g, 0.001 mol) and tertiary amine $C_2$ (0.05 g) were used.

Using a coating composition (polyamic acid solution) so prepared, a polyimide-insulated wire according to the present invention was obtained as in Example 21. The wire was evaluated in a similar manner to Example 1.

The evaluation results are shown in Table 4.

EXAMPLE 30

A polyamic acid was synthesized in a similar manner to Example 21 except that diamine $B_4$ (2.92 g, 0.01 mol), solvent DMAc (30 g), NMP (30 g), acid dianhydride $A_3$ (4.818 g, 0.011 mol) and hydroxylamine S (0.246 g, 0.002 mol) were used.

Using a coating composition (polyamic acid solution) so prepared, a polyimide-insulated wire according to the present invention was obtained as in Example 21. The wire was evaluated in a similar manner to Example 1.

The evaluation results are shown in Table 4.

EXAMPLE 31

Diphenylmethane diisocyanate was added to the polyamic acid solution of Example 30 at a ratio such that 1 equivalent of isocyanate groups was contained per equivalent of end hydroxyl groups of the polyamic acid, whereby a coating composition was obtained.

Using the coating composition thus obtained, an imidated-polyurethane-insulated wire according to the present invention was obtained as in Example 21. The wire was evaluated in a similar manner to Example 1.

The evaluation results are shown in Table 4.

EXAMPLE 32

A polyamic acid was synthesized in a similar manner to Example 21 except that diamine $B_4$ (5.84 g, 0.02 mol), solvent DMAc (50 g), NMP (50 g) and acid dianhydride $A_3$ (8.76 g, 0.02 mol) were used and hydroxylamine S was omitted.

Using a coating composition (polyamic acid solution) so prepared, a polyimide-insulated wire according to the present invention was obtained as in Example 21. The wire was evaluated in a similar manner to Example 1.

The evaluation results are shown in Table 4.

EXAMPLE 33

A polyamic acid was synthesized in a similar manner to Example 21 except that diamine $B_5$ (4.0 g, 0.02 mol), solvent DMAc (45 g), NMP (45 g) and acid dianhydride $A_3$ (8.76 g, 0.02 mol) were used and hydroxylamine S was omitted.

Using a coating composition (polyamic acid solution) so prepared, a polyimide-insulated wire according to the present invention was obtained as in Example 21. The wire was evaluated in a similar manner to Example 1.

The evaluation results are shown in Table 4.

EXAMPLE 34

A polyamic acid was synthesized in a similar manner to Example 21 except that diamine $B_2$ (6.88 g, 0.02 mol), solvent DMAc (55 g), NMP (55 g) and acid dianhydride $A_3$ (8.76 g, 0.02 mol) were used and hydroxylamine S was omitted.

Using a coating composition (polyamic acid solution) so prepared, a polyimide-insulated wire according to the present invention was obtained in Example 21. The wire was evaluated in a similar manner to Example 1.

The evaluation results are shown in Table 4.

EXAMPLE 35

A polyamic acid was synthesized in a similar manner to Example 21 except that diamine $B_4$ (5.84 g, 0.02 mol), solvent DMAc (55 g), NMP (55 g) and acid dianhydride $A_4$ (9.08 g, 0.02 mol) were used and hydroxylamine S was omitted.

Using a coating composition (polyamic acid solution) so prepared, a polyimide-insulated wire according to the present invention was obtained as in Example 21. The wire was evaluated in a similar manner to Example 1.

The evaluation results are shown in Table 4.

EXAMPLE 36

Diamine $B_7$ (2.72 g, 0.02 mol), solvent DMAc (25 g) and NMP (25 g) were charged in a reaction flask fitted with a stirrer, a thermometer and a nitrogen inlet tube. While they were maintained at 25° C. under a nitrogen gas stream, they were thoroughly stirred. To the resultant solution, were gradually added acid dianhydride $A_9$ (4.578 g, 0.021 mol) and hydroxylamine S (0.246 g, 0.002 mol). After their addition was completed, the reaction mixture was continuously stirred at 25° C. for 15 hours under a nitrogen gas stream so that a polyamic acid was synthesized.

A copper wire whose diameter was 0.4 mm was coated with a coating composition (polyamic acid solution) so prepared. The thus-coated copper wire was passed several times at a feeding speed of 10 m/min through an oven which was controlled at 370° C. and was 3.0 m long, whereby baking was conducted to obtain an insulated wire having a coating of about 20 μm thick. In an infrared absorption spectrum of the coating, absorption by imido groups was observed at 1780 cm$^{-1}$ and 1380 cm$^{-1}$.

The wire thus obtained was evaluated in accordance with the testing method for enameled copper wires and enameled aluminum wire (JIS C3003-1984). The evaluation results are shown in Table 5.

EXAMPLE 37

A polyamic acid was synthesized in a similar manner to Example 36 except that diamine $B_8$ (6.78 g, 0.03 mol), solvent DMAc (55 g), NMP (55 g), acid dianhydride $A_{10}$ (9.114 g, 0.031 mol) and hydroxylamine S (0.246 g, 0.002 mol) were used.

Using a coating composition (polyamic acid solution) so prepared, a polyimide-insulated wire according to the present invention was obtained as in Example 36. The wire was evaluated in a similar manner to Example 1.

The evaluation results are shown in Table 5.

EXAMPLE 38

A polyamic acid was synthesized in a similar manner to Example 36 except that diamine $B_6$ (3.36 g, 0.016 mol), solvent DMAc (30 g), NMP (30 g), acid dianhydride $A_{11}$ (5.474 g, 0.017 mol) and hydroxylamine S (0.246 g, 0.002 mol) were used.

Using a coating composition (polyamic acid solution) so prepared, a polyimide-insulated wire according to the present invention was obtained as in Example 36. The wire was evaluated in a similar manner to Example 1.

The evaluation results are shown in Table 5.

EXAMPLE 39

A polyamic acid was synthesized in a similar manner to Example 36 except that diamine $B_9$ (2.84 g, 0.02 mol), solvent DMAc (30 g), NMP (30 g), acid dianhydride $A_{12}$ (5.628 g, 0.021 mol) and hydroxylamine S (0.246 g, 0.002 mol) were used.

Using a coating composition (polyamic acid solution) so prepared, a polyimide-insulated wire according to the present invention was obtained as in Example 36. The wire was evaluated in a similar manner to Example 1.

The evaluation results are shown in Table 5.

EXAMPLE 40

A polyamic acid was synthesized in a similar manner to Example 36 except that diamine $B_{10}$ (2.964 g, 0.026 mol), solvent DMAc (35 g), NMP (35 g), acid dianhydride $A_{13}$ (7.236 g, 0.027 mol) and hydroxylamine S (0.246 g, 0.002 mol) were used.

Using a coating composition (polyamic acid solution) so prepared, a polyimide-insulated wire according to the present invention was obtained as in Example 36. The wire was evaluated in a similar manner to Example 1.

The evaluation results are shown in Table 5.

EXAMPLE 41

A polyamic acid was synthesized in a similar manner to Example 36 except that diamine $B_{11}$ (5.712 g, 0.024 mol), solvent DMAc (45 g), NMP (45 g), acid dianhydride $A_{14}$ (6.7 g, 0.025 mol) and hydroxylamine S (0.246 g, 0.002 mol) were used.

Using a coating composition (polyamic acid solution) so prepared, a polyimide-insulated wire according to the present invention was obtained as in Example 36. The wire was evaluated in a similar manner to Example 1.

The evaluation results are shown in Table 5.

EXAMPLE 42

A polyamic acid was synthesized in a similar manner to Example 36 except that diamine $B_{12}$ (3.48 g, 0.03 mol), solvent DMAc (50 g), NMP (50 g), acid dianhydride $A_{15}$ (9.61 g, 0.031 mol) and hydroxylamine S (0.246 g, 0.002 mol) were used.

Using a coating composition (polyamic acid solution) so prepared, a polyimide-insulated wire according to the present invention was obtained as in Example 36. The wire was evaluated in a similar manner to Example 1.

The evaluation results are shown in Table 5.

EXAMPLE 43

A polyamic acid was synthesized in a similar manner to Example 36 except that diamine $B_{13}$ (2.04 g, 0.02 mol), solvent DMAc (30 g), NMP (30 g), acid dianhydride $A_{16}$ (6.468 g, 0.021 mol) and hydroxylamine S (0.246 g, 0.002 mol) were used.

Using a coating composition (polyamic acid solution) so prepared, a polyimide-insulated wire according to the present invention was obtained as in Example 36. The wire was evaluated in a similar manner to Example 1.

The evaluation results are shown in Table 5.

EXAMPLE 44

A polyamic acid was synthesized in a similar manner to Example 36 except that diamine $B_8$ (4.52 g, 0.02 mol), solvent DMAc (40 g), NMP (40 g), acid dianhydride $A_{17}$ (7.056 g, 0.021 mol) and hydroxylamine S (0.246 g, 0.002 mol) were used.

Using a coating composition (polyamic acid solution) so prepared, a polyimide-insulated wire according to the present invention was obtained as in Example 36. The wire was evaluated in a similar manner to Example 1.

The evaluation results are shown in Table 5.

EXAMPLE 45

A polyamic acid was synthesized in a similar manner to Example 36 except that diamine $B_8$ (4.52 g, 0.02 mol), solvent DMAc (40 g), NMP (40 g), acid dianhydride $A_{11}$ (6.762 g, 0.021 mol) and hydroxylamine S (0.246 g, 0.002 mol) were used.

Using a coating composition (polyamic acid solution) so prepared, a polyimide-insulated wire according to the present invention was obtained as in Example 36. The wire was evaluated in a similar manner to Example 1.

The evaluation results are shown in Table 6.

EXAMPLE 46

A polyamic acid was synthesized in a similar manner to Example 36 except that diamine $B_{11}$ (4.76 g, 0.02 mol), solvent DMAc (40 g), NMP (40 g), acid dianhydride $A_{16}$ (6.468 g, 0.021 mol) and hydroxylamine S (0.246 g, 0.002 mol) were used.

Using a coating composition (polyamic acid solution) so prepared, a polyimide-insulated wire according to the present invention was obtained as in Example 36. The wire was evaluated in a similar manner to Example 1.

The evaluation results are shown in Table 6.

EXAMPLE 47

A polyamic acid was synthesized in a similar manner to Example 36 except that diamine $B_8$ (4.52 g, 0.02 mol), solvent DMAc (40 g), NMP (40 g), acid dianhydride $A_{11}$ (6.762 g, 0.021 mol), hydroxylamine S (0.246 g, 0.002 mol) and tertiary amine $C_1$ (0.06 g) were used.

Using a coating composition (polyamic acid solution) so prepared, a polyimide-insulated wire according to the present invention was obtained as in Example 36. The wire was evaluated in a similar manner to Example 1.

The evaluation results are shown in Table 6.

EXAMPLE 48

A polyamic acid was synthesized in a similar manner to Example 36 except that diamine $B_8$ (2.26 g, 0.01 mol), solvent DMAc (25 g), NMP (25 g), acid dianhydride $A_{11}$ (3.703 g, 0.0115 mol) and hydroxylamine S (0.369 g, 0.003 mol) were used.

Using a coating composition (polyamic acid solution) so prepared, a polyimide-insulated wire according to the present invention was obtained as in Example 36. The wire was evaluated in a similar manner to Example 1.

The evaluation results are shown in Table 6.

EXAMPLE 49

Diphenylmethane diisocyanate was added to the polyamic acid solution of Example 48 at a ratio such that 1 equivalent of isocyanate groups was contained per 1 equivalent of end hydroxyl groups of the polyamic acid, whereby a coating composition was obtained.

Using the coating composition thus obtained, an imidated-polyurethane-insulated wire according to the present invention was obtained as in Example 36. The wire was evaluated in a similar manner to Example 1.

The evaluation results are shown in Table 6.

EXAMPLE 50

A polyamic acid was synthesized in a similar manner to Example 36 except that diamine $B_8$ (4.52 g, 0.02 mol), solvent DMAc (40 g), NMP (40 g) and acid dianhydride $A_{11}$ (6.44 g, 0.02 mol) were used and hydroxylamine S was omitted.

Using a coating composition (polyamic acid solution) so prepared, a polyimide-insulated wire according to the present invention was obtained as in Example 36. The wire was evaluated in a similar manner to Example 1.

The evaluation results are shown in Table 6.

EXAMPLE 51

A polyamic acid was synthesized in a similar manner to Example 36 except that diamine $B_6$ (4.2 g, 0.02 mol), solvent DMAc (35 g), NMP (35 g) and acid dianhydride $A_{12}$ (5.36 g, 0.02 mol) were used and hydroxylamine S was omitted.

Using a coating composition (polyamic acid solution) so prepared, a polyimide-insulated wire according to the present invention was obtained as in Example 36. The wire was evaluated in a similar manner to Example 1.

The evaluation results are shown in Table 6.

EXAMPLE 52

A polyamic acid was synthesized in a similar manner to Example 36 except that diamine $B_{10}$ (2.28 g, 0.02 mol), solvent DMAc (35 g), NMP (35 g) and acid dianhydride $A_{17}$ (6.72 g, 0.02 mol) were used and hydroxylamine S was omitted.

Using a coating composition (polyamic acid solution) so prepared, a polyimide-insulated wire according to the present invention was obtained as in Example 36. The wire was evaluated in a similar manner to Example 1.

The evaluation results are shown in Table 6.

EXAMPLE 53

A polyamic acid was synthesized in a similar manner to Example 36 except that diamine $B_{13}$ (2.04 g, 0.02 mol), solvent DMAc (25 g), NMP (25 g) and acid dianhydride $A_9$ (4.36 g, 0.02 mol) were used and hydroxylamine S was omitted.

Using a coating composition (polyamic acid solution) so prepared, a polyimide-insulated wire according to the present invention was obtained as in Example 36. The wire was evaluated in a similar manner to Example 1.

The evaluation results are shown in Table 6.

Comparative examples will hereinafter be described.

COMPARATIVE EXAMPLE 1

Diamine $B_5$ (3.00 g, 0.015 mol), solvent DMAc (20 g) and NMP (20 g) were charged in a reaction flask fitted with a stirrer, a thermometer and a nitrogen inlet tube. While they were maintained at 25° C. under a nitrogen gas stream, they were thoroughly stirred. To the resultant solution, were gradually added acid dianhydride $A_9$ (3.597 g, 0.0165 mol) and hydroxylamine S (0.369 g, 0.003 mol). After their addition was completed, the reaction mixture was continuously stirred at 25° C. for 12 hours under a nitrogen gas stream so that a polyamic acid was synthesized.

A copper wire whose diameter was 0.4 mm was coated with a coating composition (polyamic acid solution) so prepared. The thus-coated copper wire was passed several times at a feeding speed of 10 m/min through an oven which was controlled at 370° C. and was 3.0 m long, whereby baking was conducted to obtain an insulated wire having a coating of about 20 μm thick. In an infrared absorption spectrum of the coating, absorption by imido groups was observed at 1380 cm$^{-1}$ and 730 cm$^{-1}$.

Similarly to Example 1, the wire thus obtained was evaluated in accordance with the testing method for enameled copper wires and enameled aluminum wires (JIS C3003-1984). The evaluation results are shown in Table 1.

COMPARATIVE EXAMPLE 2

A polyamic acid was synthesized in a similar manner to Comparative Example 1 except that diamine $B_3$ (2.97 g, 0.015 mol), solvent DMAc (20 g), NMP (20 g) acid dianhydride $A_9$ (3.587 g, 0.0165 mol) and hydroxylamine S (0.369 g, 0.003 mol) were used.

Using a coating composition (polyamic acid solution) so prepared, a polyimide-insulated wire invention was obtained as in Comparative Example 1. The wire was evaluated in a similar manner to Example 1.

The evaluation results are shown in Table 1.

COMPARATIVE EXAMPLE 3

A polyamic acid was synthesized in a similar manner to Comparative Example 1 except that diamine $B_5$ (3.00 g, 0.015 mol), solvent DMAc (20 g), NMP (20 g) and acid dianhydride $A_9$ (3.27 g, 0.015 mol) were used and hydroxylamine S was omitted.

Using a coating composition (polyamic acid solution) so prepared, a polyimide-insulated wire was obtained as in Comparative Example 1. The wire was evaluated in a similar manner to Example 1.

The evaluation results are shown in Table 1.

COMPARATIVE EXAMPLE 4

A polyamic acid was synthesized in a similar manner to Comparative Example 1 except that diamine $B_3$ (3.96 g, 0.02 mol), solvent DMAc (25 g), NMP (25 g) and acid dianhydride $A_9$ (4.36 g, 0.02 mol) were used and hydroxylamide S was omitted.

Using a coating composition (polyamic acid solution) so prepared, a polyimide-insulated wire was obtained as in Comparative Example 1. The wire was evaluated in a similar manner to Example 1.

The evaluation results are shown in Table 1.

COMPARATIVE EXAMPLE 5

Diamine $B_3$ (3.96 g, 0.02 mol), solvent DMAc (40 g) and NMP (40 g) were charged in a reaction flask fitted with a stirrer, a thermometer and a nitrogen inlet tube. While they were maintained at 25° C. under a nitrogen gas stream, they were thoroughly stirred. To the resultant solution, were gradually added acid dianhydride A$_9$ (4.578 g, 0.021 mol) and hydroxylamine S (0.246 g, 0.002 mol). After their addition was completed, the reaction mixture was continuously stirred at 25° C. for 14 hours under a nitrogen gas stream so that a polyamic acid was synthesized.

A copper wire whose diameter was 0.4 mm was coated with a coating composition (polyamic acid solution) so prepared. The thus-coated copper wire was passed several times at a feeding speed of 10 m/min through an oven which was controlled at 380° C. and was 3.0 m long, whereby baking was conducted to obtain an insulated wire having a coating of about 20 μm thick. In an infrared absorption spectrum of the coating, absorption by imido groups was observed at 1780 cm$^{-1}$ and 1380 cm$^{-1}$.

Similarly to Example 1, the wire thus obtained was evaluated in accordance with the testing method for enameled copper wires and enameled aluminum wires (JIS C3003-1984). The evaluation results are shown in Table 2.

COMPARATIVE EXAMPLE 6

A polyamic acid was synthesized in a similar manner to Comparative Example 1 except that diamine B$_3$ (3.96 g, 0.02 mol), solvent DMAc (40 g), NMP (40 g) and acid dianhydride A$_9$ (4.36 g, 0.02 mol) were used and hydroxylamine S was omitted.

Using a coating composition (polyamic acid solution) so prepared, a polyimide-insulated wire was obtained as in Comparative Example 5. The wire was evaluated in a similar manner to Example 1.

The evaluation results are shown in Table 2.

COMPARATIVE EXAMPLE 7

A coating composition was obtained by dissolving a polyester polyol (10 g; "Desmophene 600", trade name; product of Sumitomo Bayer Urethane Co., Ltd.), said polyester polyol having been synthesized from a polyhydric alcohol and a polycarboxylic acid, "Desmodule CT Staple" (21.2 g; trade name; product of Sumitomo Bayer Urethane Co., Ltd.) as a blocked isocyanate and lead octylate (0.2 g) in cresol (40 g).

Using the coating composition thus obtained, an insulated wire was obtained as in Comparative Example 5. It was evaluated in a similar manner to Example 1.

The evaluation results are shown in Table 2.

COMPARATIVE EXAMPLE 8

Diamine B$_3$ (3.96 g, 0.02 mol), solvent DMAc (30 g) and NMP (30 g) were charged in a reaction flask fitted with a stirrer, a thermometer and a nitrogen inlet tube. While they were maintained at 25° C. under a nitrogen gas stream, they were thoroughly stirred. To the resultant solution, were gradually added acid dianhydride A$_9$ (4.469 g, 0.0205 mol) and hydroxylamine S (0.123 g, 0.001 mol). After their addition was completed, the reaction mixture was continuously stirred at 25° C. for 15 hours under a nitrogen gas stream so that a polyamic acid was synthesized.

A copper wire whose diameter was 0.4 mm was coated with a coating composition (polyamic acid solution) so prepared. The thus-coated copper wire was passed several times at a feeding speed of 10 m/min through an oven which was controlled at 370° C. and was 3.0 m long, whereby baking was conducted to obtain an insulated wire having a coating of about 20 μm thick. In an infrared absorption spectrum of the coating, absorption by imido groups was observed at 1380 cm$^{-1}$ and 730 cm$^{-1}$.

Similarly to Example 1, the wire thus obtained was evaluated in accordance with the testing method for enameled copper wires and enameled aluminum wires (JIS C3003-1984). The evaluation results are shown in Table 3 and Table 4.

COMPARATIVE EXAMPLE 9

A polyamic acid was synthesized in a similar manner to Comparative Example 8 except that diamine B$_3$ (3.96 g, 0.02 mol), solvent DMAc (35 g), NMP (35 g) acid dianhydride A$_{10}$ (6.027 g, 0.0205 mol) and hydroxylamine S (0.123 g, 0.001 mol) were used.

Using a coating composition (polyamic acid solution) so prepared, a polyimide-insulated wire was obtained as in Comparative Example 8. The wire was evaluated in a similar manner to Example 1.

The evaluation results are shown in Table 3 and Table 4.

COMPARATIVE EXAMPLE 10

A polyamic acid was synthesized in a similar manner to Comparative Example 8 except that diamine B$_3$ (3.96 g, 0.02 mol), solvent DMAc (35 g), NMP (35 g) and acid dianhydride A$_{11}$ (6.44 g, 0.02 mol) were used and hydroxylamine S was omitted.

Using a coating composition (polyamic acid solution) so prepared, a polyimide-insulated wire was obtained as in Comparative Example 8. The wire was evaluated in a similar manner to Example 1.

The evaluation results are shown in Table 3 and Table 4.

COMPARATIVE EXAMPLE 11

A polyamic acid was synthesized in a similar manner to Comparative Example 8 except that diamine B$_3$ (3.96 g, 0.02 mol), solvent DMAc (30 g), NMP (30 g) and acid dianhydride A$_9$ (4.36 g, 0.02 mol) were used and hydroxylamine S was omitted.

Using a coating composition (polyamic acid solution) so prepared, a polyimide-insulated wire was obtained as in Comparative Example 8. The wire was evaluated in a similar manner to Example 1.

The evaluation results are shown in Table 3 and Table 4.

COMPARATIVE EXAMPLE 12

Diamine B$_3$ (3.96 g, 0.02 mol), solvent DMAc (30 g) and NMP (30 g) were charged in a reaction flask fitted with a stirrer, a thermometer and a nitrogen inlet tube. While they were maintained at 25° C. under a nitrogen gas stream, they were thoroughly stirred. To the resultant solution, were gradually added acid dianhydride A$_9$ (4.578 g, 0.021 mol) and hydroxylamine S (0.246 g, 0.002 mol). After their addition was completed, the reaction mixture was continuously stirred at 25° C. for 15 hours under a nitrogen gas stream so that a polyamic acid was synthesized.

A copper wire whose diameter was 0.4 mm was coated with a coating composition (polyamic acid solution) so prepared. The thus-coated copper wire was passed several times at a feeding speed of 10 m/min through an oven which was controlled at 370° C. and was 3.0 m long, whereby baking was conducted to obtain an insulated wire having a coating of about 20 μm thick. In an infrared absorption spectrum of the coating, absorption by imido groups was observed at 1780 cm$^{-1}$ and 1380 cm$^{-1}$.

Similarly to Example 1, the wire thus obtained was evaluated in accordance with the testing method for enameled copper wires and enameled aluminum wires (JIS C3003-1984). The evaluation results are shown in Table 5 and Table 6.

COMPARATIVE EXAMPLE 13

A polyamic acid was synthesized in a similar manner to Comparative Example 12 except that diamine B$_5$ (4.0 g, 0.02 mol), solvent DMAc (35 g), NMP (35 g) acid dianhydride A$_{12}$ (5.628 g, 0.021 mol) and hydroxylamine S (0.246 g, 0.002 mol) were used.

Using a coating composition (polyamic acid solution) so prepared, a polyimide-insulated wire was obtained as in Comparative Example 12. The wire was evaluated in a similar manner to Example 1.

The evaluation results are shown in Table 5 and Table 6.

COMPARATIVE EXAMPLE 14

A polyamic acid was synthesized in a similar manner to Comparative Example 12 except that diamine B$_3$ (3.96 g, 0.02 mol), solvent DMAc (30 g), NMP (30 g) and acid dianhydride A$_9$ (4.36 g, 0.02 mol) were used and hydroxylamine S was omitted.

Using a coating composition (polyamic acid solution) so prepared, a polyimide-insulated wire was obtained as in Comparative Example 12. The wire was evaluated in a similar manner to Example 1.

The evaluation results are shown in Table 5 and Table 6.

COMPARATIVE EXAMPLE 15

A polyamic acid was synthesized in a similar manner to Comparative Example 12 except that diamine B$_5$ (4.0 g, 0.02 mol), solvent DMAc (35 g), NMP (35 g) and acid dianhydride A$_{12}$ (5.36 g, 0.02 mol) were used and hydroxylamine S was omitted.

Using a coating composition (polyamic acid solution) so prepared, a polyimide-insulated wire was obtained as in Comparative Example 12. The wire was evaluated in a similar manner to Example 1.

The evaluation results are shown in Table 5 and Table 6.

TABLE 1

| Sample No. Properties | Example | | | | | | | | |
|---|---|---|---|---|---|---|---|---|---|
| | 1 | 2 | 3 | 4 | 5 | 6 | 7 | 8 | 9 |
| Flexibility | good/1d | good/1d | good/1d | good/1d | good/1d | good/1d | good/1d | good/1d | good/1d |
| Adhesion | good | good | good | good | good | good | good | good | good |
| Heat softening temperature (°C., 500 g crossing method) | 352 | 340 | 330 | 350 | 353 | 362 | 370 | 345 | 353 |
| Breakdown voltage (kV) | 5.5 | 5.8 | 5.7 | 5.4 | 5.9 | 5.7 | 5.5 | 5.6 | 5.7 |
| Thermal deterioration resistance (220° C. × 24 hr) | good/2d | good/2d | good/2d | good/2d | good/2d | good/2d | good/2d | good/2d | good/2d |
| Solderability 390° C. (sec) | 9 | 10 | 9 | 11 | 9 | 11 | 10 | 9 | 10 |
| 450° C. | 5 | 4 | 3 | 4 | 5 | 3 | 5 | 4 | 6 |
| Pinholes (Number of pinholes/5 m) | 0 | 0 | 0 | 0 | 0 | 0 | 0 | 0 | 0 |
| Chemical and solvent resistance (hr) | 5 | 5 | 5 | 5 | 5 | 5 | 5 | 5 | 5 |

| Sample No. Properties | Example | | Comparative Example | | | |
|---|---|---|---|---|---|---|
| | 10 | 11 | 1 | 2 | 3 | 4 |
| Flexibility | good/1d | good/1d | good/1d | good/1d | good/1d | good/1d |
| Adhesion | good | good | good | good | good | good |
| Heat softening temperature (°C., 500 g crossing method) | 355 | 360 | 342 | 351 | 345 | 351 |
| Breakdown voltage (kV) | 5.5 | 5.6 | 5.6 | 5.5 | 5.7 | 5.7 |
| Thermal deterioration resistance (220° C. × 24 hr) | good/2d | good/2d | good/2d | good/2d | good/2d | good/2d |
| Solderability 390° C. (sec) | 10 | 11 | Impossible | Impossible | Impossible | Impossible |
| 450° C. | 4 | 5 | Impossible | Impossible | Impossible | Impossible |
| Pinholes (Number of pinholes/5 m) | 0 | 0 | 0 | 0 | 0 | 0 |
| Chemical and solvent resistance (hr) | 5 | 5 | 5 | 5 | 5 | 5 | good/1d: No cracks were developed when wound 50 turns around 1-unit diameter.

TABLE 2

| Sample No. Properties | Example | | | | | | |
|---|---|---|---|---|---|---|---|
| | 12 | 13 | 14 | 15 | 16 | 17 | 18 |
| Flexibility | good/1d | good/1d | good/1d | good/1d | good/1d | good/1d | good/1d |
| Adhesion | good | good | good | good | good | good | good |
| Heat softening temperature (°C., 500 g | 352 | 350 | 360 | 340 | 351 | 361 | 345 |

TABLE 2-continued

|  | | | | | | | |
|---|---|---|---|---|---|---|---|
| crossing method) | | | | | | | |
| Breakdown voltage (kV) | 5.5 | 5.7 | 5.5 | 5.7 | 5.5 | 5.6 | 5.7 |
| Thermal deterioration resistance (220° C. × 24 hr) | good/2d | good/2d | good/2d | good/2d | good/2d | good/2d | good/2d |
| Solderability 390° C. (sec) 450° C. | 10 / 5 | 9 / 5 | 10 / 4 | 11 / 4 | 9 / 6 | 10 / 5 | 10 / 5 |
| Pinholes (Number of pinholes/5 m) | 0 | 0 | 0 | 0 | 0 | 0 | 0 |
| Chemical and solvent resistance (hr) | 5 | 5 | 5 | 5 | 5 | 5 | 5 |

| Sample No. | Example | | Comparative Example | | |
|---|---|---|---|---|---|
| Properties | 19 | 20 | 5 | 6 | 7 |
| Flexibility | good/1d | good/1d | good/1d | good/1d | good/1d |
| Adhesion | good | good | good | good | good |
| Heat softening temperature (°C., 500 g crossing method) | 352 | 347 | 351 | 345 | 256 |
| Breakdown voltage (kV) | 5.5 | 5.6 | 5.5 | 5.7 | 5.7 |
| Thermal deterioration resistance (220° C. × 24 hr) | good/2d | good/2d | good/2d | good/2d | good/5d* |
| Solderability 390° C. (sec) 450° C. | 11 / 4 | 9 / 6 | Impossible / Impossible | Impossible / Impossible | 5 / 2 |
| Pinholes (Number of pinholes/5 m) | 0 | 0 | 0 | 0 | 0 |
| Chemical and solvent resistance (hr) | 5 | 5 | 5 | 5 | 5 |

*200° C. × 24 hr.
good/1d: No cracks were developed when wound 50 turns around 1-unit diameter

TABLE 3

| Sample No. | Example | | | | | | |
|---|---|---|---|---|---|---|---|
| Properties | 21 | 22 | 23 | 24 | 25 | 26 | 27 |
| Flexibility | good/1d | good/1d | good/1d | good/1d | good/1d | good/1d | good/1d |
| Adhesion | good | good | good | good | good | good | good |
| Heat softening temperature (°C., 500 g crossing method) | 342 | 340 | 353 | 347 | 346 | 353 | 341 |
| Breakdown voltage (kV) | 5.4 | 5.3 | 5.7 | 5.5 | 5.6 | 5.8 | 5.3 |
| Thermal deterioration resistance (220° C. × 24 hr) | good/2d | good/2d | good/2d | good/2d | good/2d | good/2d | good/2d |
| Solderability 390° C. (sec) 450° C. | 9 / 4 | 8 / 3 | 11 / 5 | 9 / 6 | 10 / 5 | 10 / 6 | 9 / 3 |
| Pinholes (Number of pinholes/5 m) | 0 | 0 | 0 | 0 | 0 | 0 | 0 |
| Chemical and solvent resistance (hr) | 5 | 5 | 5 | 5 | 5 | 5 | 5 |

| Sample No. | Example | Comparative Example | | | |
|---|---|---|---|---|---|
| Properties | 28 | 8 | 9 | 10 | 11 |
| Flexibility | good/1d | good/1d | good/1d | good/1d | good/1d |
| Adhesion | good | good | good | good | good |
| Heat softening temperature (°C., 500 g crossing method) | 348 | 351 | 353 | 354 | 355 |
| Breakdown voltage (kV) | 5.5 | 5.8 | 5.7 | 5.9 | 5.9 |
| Thermal deterioration resistance (220° C. × 24 hr) | good/2d | good/2d | good/2d | good/2d | good/5d |
| Solderability 390° C. (sec) 450° C. | 9 / 5 | Impossible / Impossible | Impossible / Impossible | Impossible / Impossible | Impossible / Impossible |
| Pinholes (Number of pinholes/5 m) | 0 | 0 | 0 | 0 | 0 |
| Chemical and solvent resistance (hr) | 5 | 5 | 5 | 5 | 5 | good/1d: No cracks were developed when wound 50 turns around 1-unit diameter

TABLE 4

| Sample No. | Example | | | | | | |
|---|---|---|---|---|---|---|---|
| Properties | 29 | 30 | 31 | 32 | 33 | 34 | 35 |

TABLE 4-continued

| | | | | | | | |
|---|---|---|---|---|---|---|---|
| Flexibility | good/1d | good/1d | good/1d | good/1d | good/1d | good/1d | good/1d |
| Adhesion | good | good | good | good | good | good | good |
| Heat softening temperature (°C., 500 g crossing method) | 352 | 348 | 351 | 350 | 344 | 347 | 351 |
| Breakdown voltage (kV) | 5.7 | 5.6 | 5.7 | 5.8 | 5.4 | 5.6 | 5.7 |
| Thermal deterioration resistance (220° C. × 24 hr) | good/2d | good/2d | good/2d | good/2d | good/2d | good/2d | good/2d |
| Solderability 390° C. (sec) | 11 | 10 | 10 | 10 | 9 | 10 | 11 |
| 450° C. | 6 | 5 | 5 | 6 | 5 | 5 | 6 |
| Pinholes (Number of pinholes/5 m) | 0 | 0 | 0 | 0 | 0 | 0 | 0 |
| Chemical and solvent resistance (hr) | 5 | 5 | 5 | 5 | 5 | 5 | 5 |

| Sample No. | Comparative Example | | | |
|---|---|---|---|---|
| Properties | 8 | 9 | 10 | 11 |
| Flexibility | good/1d | good/1d | good/1d | good/1d |
| Adhesion | good | good | good | good |
| Heat softening temperature (°C., 500 g crossing method) | 351 | 353 | 354 | 355 |
| Breakdown voltage (kV) | 5.8 | 5.7 | 5.9 | 5.9 |
| Thermal deterioration resistance (220° C. × 24 hr) | good/2d | good/2d | good/2d | good/2d |
| Solderability 390° C. (sec) | Impossible | Impossible | Impossible | Impossible |
| 450° C. | Impossible | Impossible | Impossible | Impossible |
| Pinholes (Number of pinholes/5 m) | 0 | 0 | 0 | 0 |
| Chemical and solvent resistance (hr) | 5 | 5 | 5 | 5 | good/1d: No cracks were developed when wound 50 turns around 1-unit diameter

TABLE 5

| Sample No. | Example | | | | | | | |
|---|---|---|---|---|---|---|---|---|
| Properties | 36 | 37 | 38 | 39 | 40 | 41 | 42 | 43 |
| Flexibility | good/1d | good/1d | good/1d | good/1d | good/1d | good/1d | good/1d | good/1d |
| Adhesion | good | good | good | good | good | good | good | good |
| Heat softening temperature (°C., 500 g crossing method) | 349 | 349 | 348 | 350 | 353 | 352 | 345 | 348 |
| Breakdown voltage (kV) | 5.6 | 5.6 | 5.6 | 5.6 | 5.7 | 5.7 | 5.4 | 5.5 |
| Thermal deterioration resistance (220° C. × 24 hr) | good/2d | good/2d | good/2d | good/2d | good/2d | good/2d | good/2d | good/2d |
| Solderability 390° C. (sec) | 9 | 10 | 9 | 10 | 11 | 11 | 8 | 8 |
| 450° C. | 4 | 5 | 4 | 5 | 6 | 5 | 3 | 3 |
| Pinholes (Number of pinholes/5 m) | 0 | 0 | 0 | 0 | 0 | 0 | 0 | 0 |
| Chemical and solvent resistance (hr) | 5 | 5 | 5 | 5 | 5 | 5 | 5 | 5 |

| Sample No. | Example | Comparative Example | | | |
|---|---|---|---|---|---|
| Properties | 44 | 12 | 13 | 14 | 15 |
| Flexibility | good/1d | good/1d | good/1d | good/1d | good/1d |
| Adhesion | good | good | good | good | good |
| Heat softening temperature (°C., 500 g crossing method) | 347 | 351 | 352 | 355 | 355 |
| Breakdown voltage (kV) | 5.5 | 5.7 | 5.7 | 5.9 | 5.8 |
| Thermal deterioration resistance (220° C. × 24 hr) | good/2d | good/2d | good/2d | good/2d | good/2d |
| Solderability 390° C. (sec) | 8 | Impossible | Impossible | Impossible | Impossible |
| 450° C. | 3 | Impossible | Impossible | Impossible | Impossible |
| Pinholes (Number of pinholes/5 m) | 0 | 0 | 0 | 0 | 0 |
| Chemical and solvent resistance (hr) | 5 | 5 | 5 | 5 | 5 | good/1d: No cracks were developed when wound 50 turns around 1-unit diameter.

TABLE 6

| Sample No. | Example | | | | | | | |
|---|---|---|---|---|---|---|---|---|
| Properties | 45 | 46 | 47 | 48 | 49 | 50 | 51 | 52 |
| Flexibility | good/1d | good/1d | good/1d | good/1d | good/1d | good/1d | good/1d | good/1d |
| Adhesion | good | good | good | good | good | good | good | good |
| Heat softening temperature (°C., 500 g crossing method) | 348 | 350 | 349 | 348 | 349 | 349 | 351 | 350 |
| Breakdown voltage (kV) | 5.6 | 5.6 | 5.6 | 5.6 | 5.6 | 5.6 | 5.7 | 5.7 |
| Thermal deterioration resistance (220° C. × 24 hr) | good/2d | good/2d | good/2d | good/2d | good/2d | good/2d | good/2d | good/2d |
| Solderability  390° C. (sec) | 9 | 10 | 10 | 9 | 8 | 10 | 11 | 11 |
| 450° C. | 4 | 4 | 4 | 4 | 3 | 5 | 6 | 5 |
| Pinholes (Number of pinholes/5 m) | 0 | 0 | 0 | 0 | 0 | 0 | 0 | 0 |
| Chemical and solvent resistance (hr) | 5 | 5 | 5 | 5 | 5 | 5 | 5 | 5 |

| Sample No. | Example | Comparative Example | | | |
|---|---|---|---|---|---|
| Properties | 53 | 12 | 13 | 14 | 15 |
| Flexibility | good/1d | good/1d | good/1d | good/1d | good/1d |
| Adhesion | good | good | good | good | good |
| Heat softening temperature (°C., 500 g crossing method) | 348 | 351 | 352 | 355 | 355 |
| Breakdown voltage (kV) | 5.6 | 5.7 | 5.7 | 5.9 | 5.8 |
| Thermal deterioration resistance (220° C. × 24 hr) | good/2d | good/2d | good/2d | good/2d | good/2d |
| Solderability  390° C. (sec) | 9 | Impossible | Impossible | Impossible | Impossible |
| 450° C. | 4 | Impossible | Impossible | Impossible | Impossible |
| Pinholes (Number of pinholes/5 m) | 0 | 0 | 0 | 0 | 0 |
| Chemical and solvent resistance (hr) | 5 | 5 | 5 | 5 | 5 | good/1d: No cracks were developed when wound 50 turns around 1-unit diameter.

As is apparent from the results of Tables 1-6, insulated wires according to the present invention are equal or superior in general properties to conventional products (the comparative examples) and have excellent solderability compared with the latter.

The wires according to the present invention are therefore excellent wires which are superior in heat resistance and permit soldering.

An application example of insulated wires of the present invention to color TV flyback transformers will next be described.

A service life test under voltage was conducted with respect to a flyback transformer (FBT) which employed a wire according to the present invention.

Figure 2:
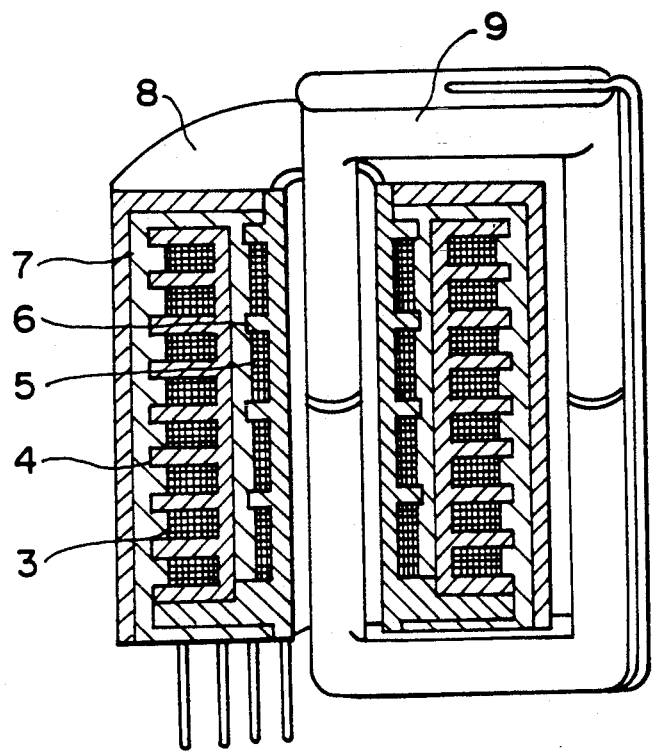
FIG. 2 is a schematic cross-sectional view of a flyback transformer for a color TV set.
Figure 3:
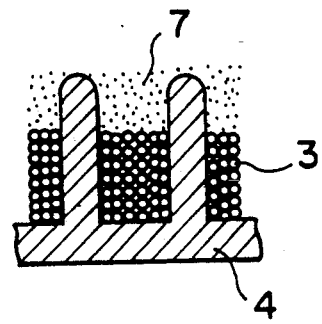
FIG. 3 is an enlarged view of a high-voltage coil portion in the cross-sectional view of the transformer.

A schematic cross-sectional view of the color TV FBT is depicted in FIG. 2. In addition, FIG. 3 illustrates on a large scale a high-voltage portion which significantly governs the service life.

These drawings show a high-voltage winding 3, a high-voltage bobbin 4, a low-voltage winding 5, and a low-voltage bobbin 6. The high-voltage winding 3 is wound in grooves formed in the high-voltage bobbin 4, while the low-voltage winding 5 is wound in grooves formed in the low-voltage bobbin 6. There are also illustrated a filler 7, a casing 8 and a core 9.

In general, the voltage between windings which are in contact to each other is said to range from 10 V to 300 V.

Two wires were therefore wound, in a contiguous relationship, around a plastic cylinder. They were embedded in a filler (epoxy resin). While a voltage of 3 kV was applied across both ends which extended out into the air, the plastic cylinder with the wires wound thereon was left over at 110° C. to conduct an accelerated service life test of the FBT. The time until dielectric breakdown was recorded.

In the service life tests of wires (copper diameter: 0.06 mm, coating thickness: 0.01 mm) which employed the coating materials of Invention Examples 1, 2, 3, 22, 28, 32, 35, 37, 49, 50 and 51, respectively, the time until occurrence of 1% defective was found to be 450 hr, 500 hr, 600 hr, 530 hr, 550 hr, 580 hr, 560 hr, 540 hr, 550 hr, 570 hr and 560 hr, respectively, according to the Weibull plotting.

On the other hand, as a comparative coating material, a general-purpose polyurethane resin formed from "Desmophene 800" (polyol, product of Sumitomo Bayer Urethane Co., Ltd.) and "Desmodule CT Staple" (blocked isocyanate, product of Sumitomo Bayer Urethane Co., Ltd.) was chosen. Using the polyurethane resin, an insulated wire was produced. The insulated wire was subjected to the same accelerated service life test as that conducted above. As a result, the time until occurrence of 1% defective was found to be as quick as 40 hr. It was hence clearly demonstrated that the insulated wire produced using the comparative coating material was far inferior to those obtained using the coating materials of the invention examples.

Consequently, use of wires according to the present invention makes it possible to provide FBTs having longer service life and capable of giving higher outputs compared to the conventional products (comparative examples) which use such a general-purpose polyurethane resin.

We claim:

1. A solderable, insulated wire having a polyimide resin coating, which has been produced by coating a conductor with an insulating coating composition, which comprises a polyamide acid represented by the following formula (1), and then baking the thus-coated composition,

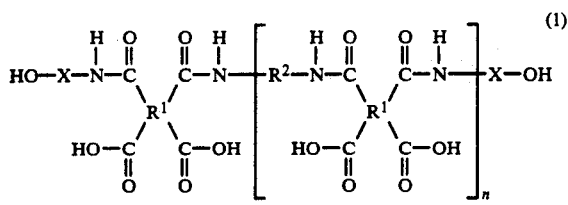

wherein
X represents an alkylene or alkylenephenylene group,
n represents a positive integer,
$R^1$ represents a tetravalent organic group, and
$R^2$ represents a divalent organic group, with the proviso that $R^2$ represents a divalent organic group selected from the group consisting of divalent organic groups represented by the following formulae (3):

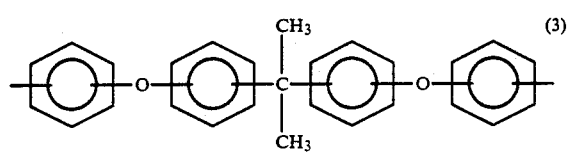

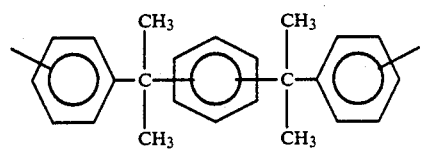

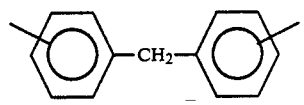

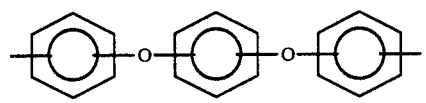

when $R^1$ is a tetravalent organic group selected from the group consisting of tetravalent organic groups represented by the following formulae (2):

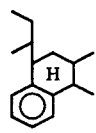

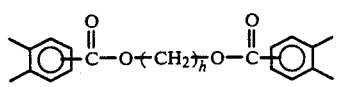

-continued

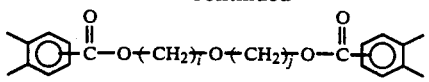

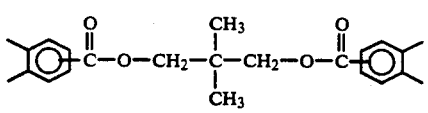

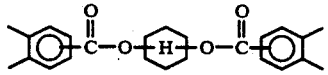

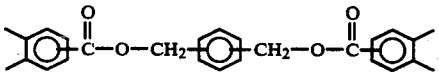

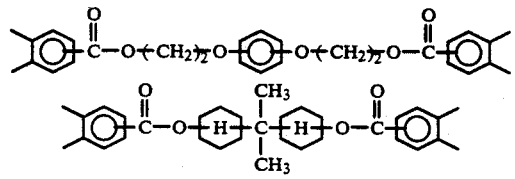

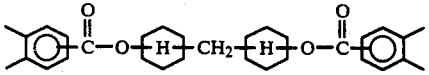

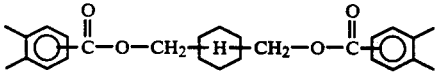

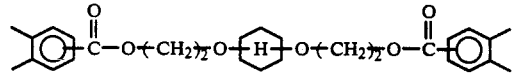

h being an integer of 2–16, and
i and j being individually an integer of 2–10,
and $R^2$ represents a divalent organic group selected from the group consisting of divalent organic groups represented by the following formulae (5):

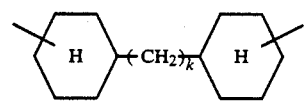

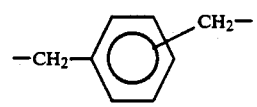

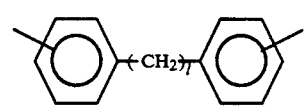

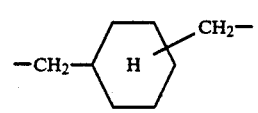

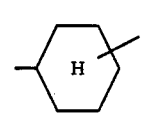

-continued

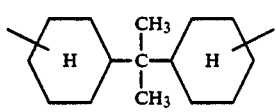

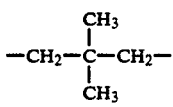

k being an integer of 1-10, and
l and m being individually an integer of 2-10
when $R^1$ is a tetravalent organic group selected from the group consisting of tetravalent organic groups represented by the following formulae (4):

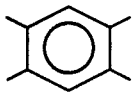

(4)

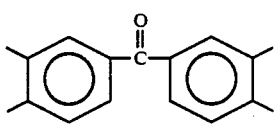

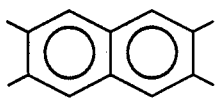

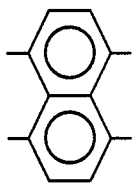

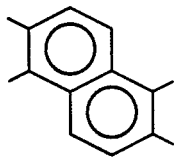

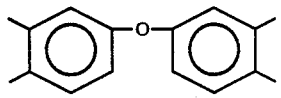

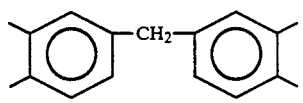

-continued

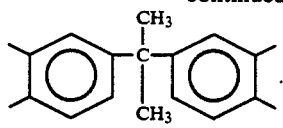

2. A process for the production of a solderable insulated wire, which comprises:
i) reacting a hydroxylamine represented by the following formula (6):

$$HO-X-NH_2 \quad (6),$$

a tetracarboxylic dianhydride represented by the following formula (7):

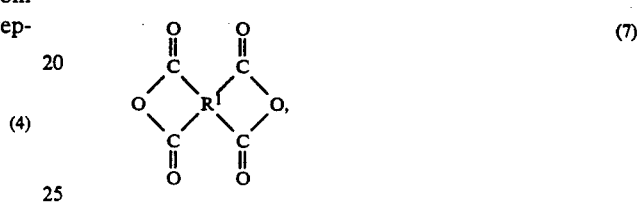

(7)

and a diamine represented by the following formula (8):

$$H_2N-R^2-NH_2 \quad (8)$$

in the presence of an organic solvent to form a polyamic acid represented by the following formula (1):

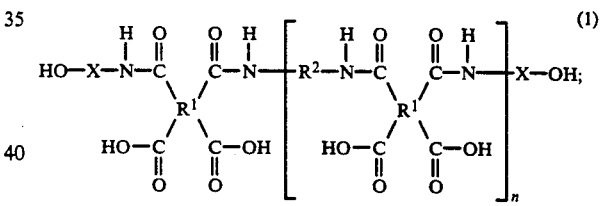

(1)

ii) coating a conductor with an insulating coating composition, which comprises the polyamic acid of the formula (1); and
iii) baking the thus-coated composition to cause the amide groups and carboxyl groups in the formula (1) to undergo an intramolecular reaction, whereby the polyamic acid of the formula (1) is imidated into a polyimide resin,
wherein in said formulae (6), (7), (8) and (1),
X being an alkylene or alkylenephenylene group,
n being a positive integer,
$R^1$ represents a tetravalent organic group, and
$R^2$ represents a divalent organic group, with the proviso that $R^2$ represents a divalent organic group selected from the group consisting of divalent organic groups represented by the following formulae (3):

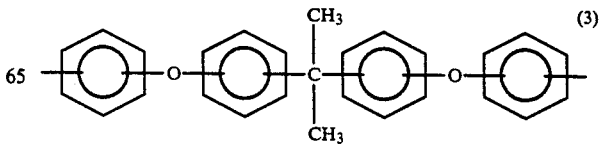

(3)

-continued

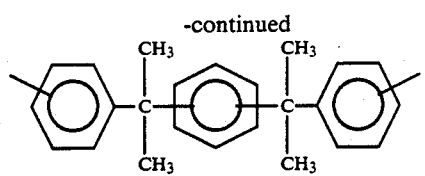

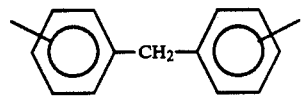

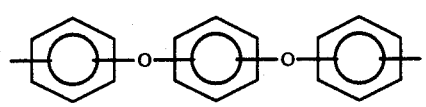

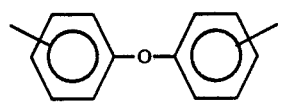

when R¹ is a tetravalent organic group selected from the group consisting of tetravalent organic groups represented by the following formulae (2):

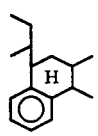
(2)

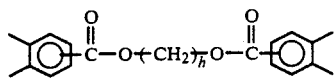

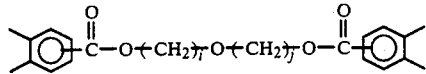

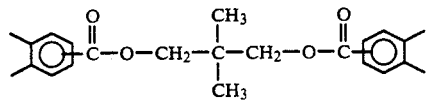

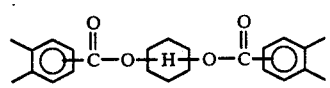

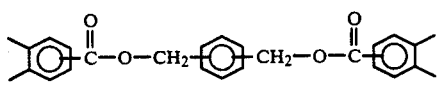

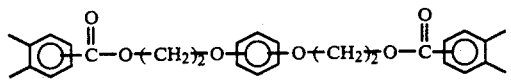

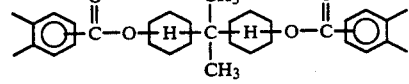

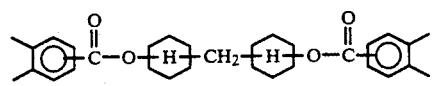

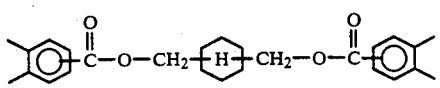

-continued

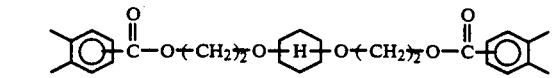

h being an integer of 2-16, and
i and j being individually an integer of 2-10,
and R² represents a divalent organic group selected from the group consisting of divalent organic groups represented by the following formulae (5):

(5)

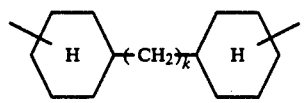

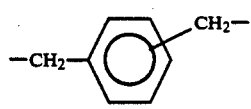

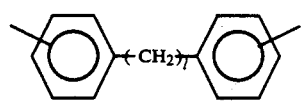

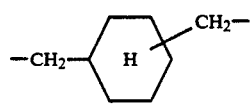

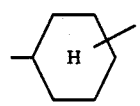

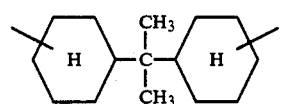

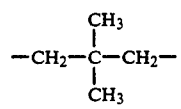

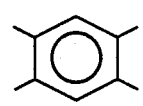

k being an integer of 1-10, and
l and m being individually an integer of 2-10
when R¹ is a tetravalent organic group selected from the group consisting of tetravalent organic groups represented by the following formulae (4):

(4)

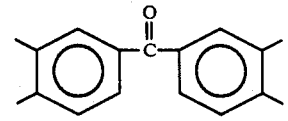

-continued

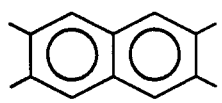

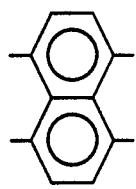

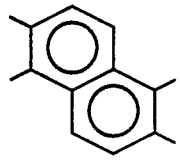

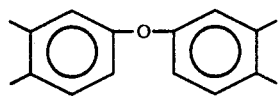

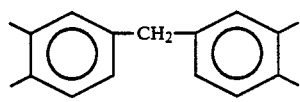

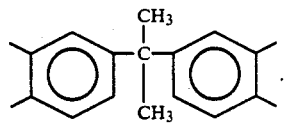

3. The process of claim 2, wherein said insulating coating composition further comprises a catalytic amount of tertiary amine.

4. An insulating coating composition comprising a polyamic acid represented by the following formula (1):

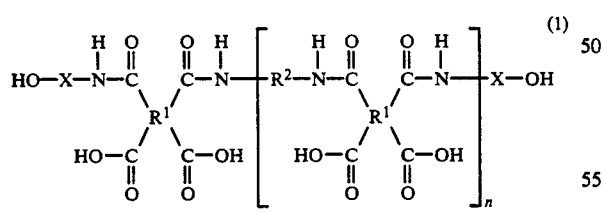

wherein
X represents an alkylene or alkylenephenylene group,
n represents a positive integer,
$R^1$ represents a tetravalent organic group, and
$R^2$ represents a divalent organic group, with the proviso that $R^2$ represents a divalent organic group selected from the group consisting of divalent organic groups represented by the following formulae (3):

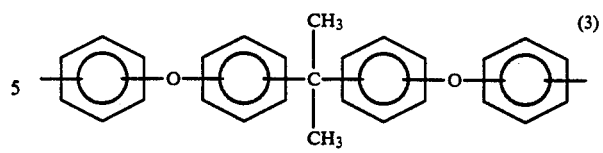

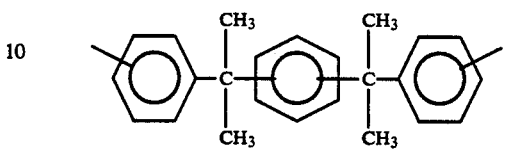

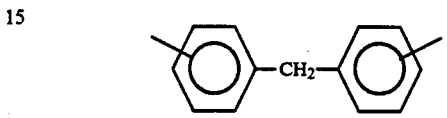

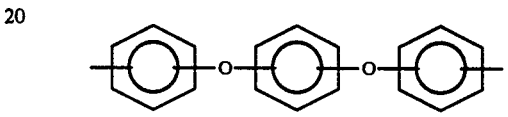

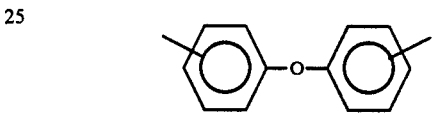

when $R^1$ is a tetravalent organic group selected from the group consisting of tetravalent organic groups represented by the following formulae (2):

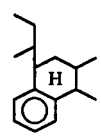

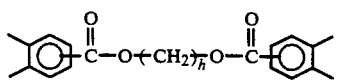

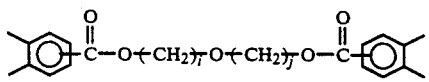

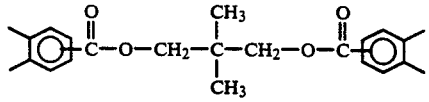

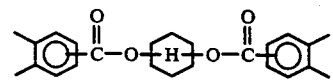

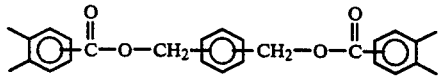

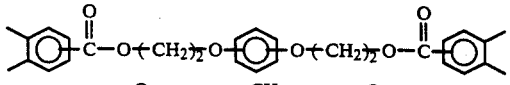

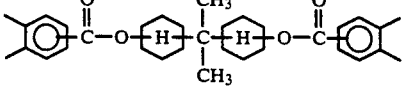

-continued

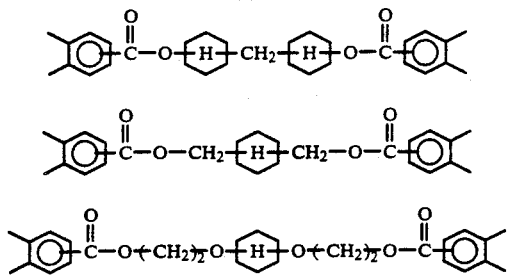

h being an integer of 2-16, and
i and j being individually an integer of 2-10,
and R² represents a divalent organic group selected from the group consisting of divalent organic groups represented by the following formulae (5):

(5)

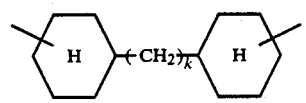

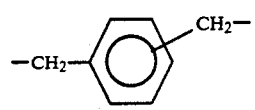

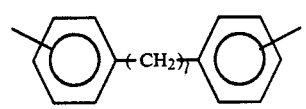

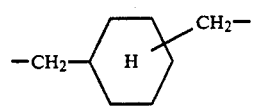

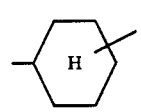

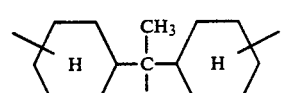

$-(CH_2)_m-$

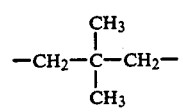

k being an integer of 1-10, and
l and m being individually an integer of 2-10
when R¹ is a tetravalent organic group selected from the group consisting of tetravalent organic groups represented by the following formulae (4):

(4)

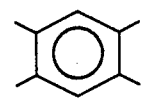

-continued

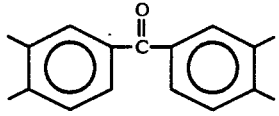

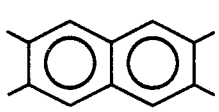

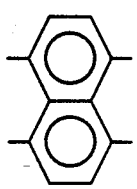

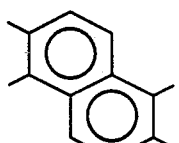

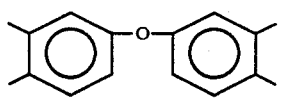

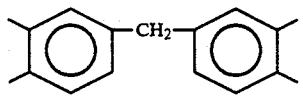

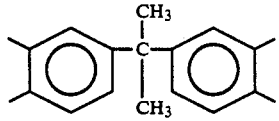

5. A solderable, insulated wire having an imidated polyurethane resin coating, which has been produced by:
  i) coating a conductor with an insulating coating composition comprising (a) a polyamic acid represented by the following formula (1):

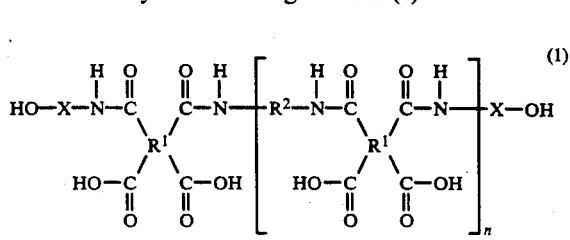

(1)

wherein
X represents an alkylene or alkylenephenylene group,
n represents a positive integer,
R¹ represents a tetravalent organic group, and R² represents a divalent organic group, with the proviso that R² represents a divalent organic group selected from the group consisting of divalent organic groups represented by the following formulae (3):

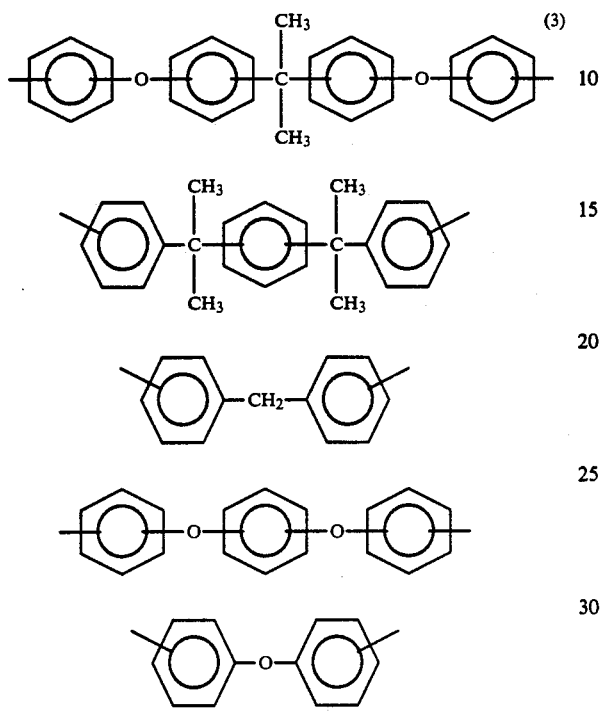

(3)

when R¹ is a tetravalent organic group selected from the group consisting of tetravalent organic groups represented by the following formulae (2):

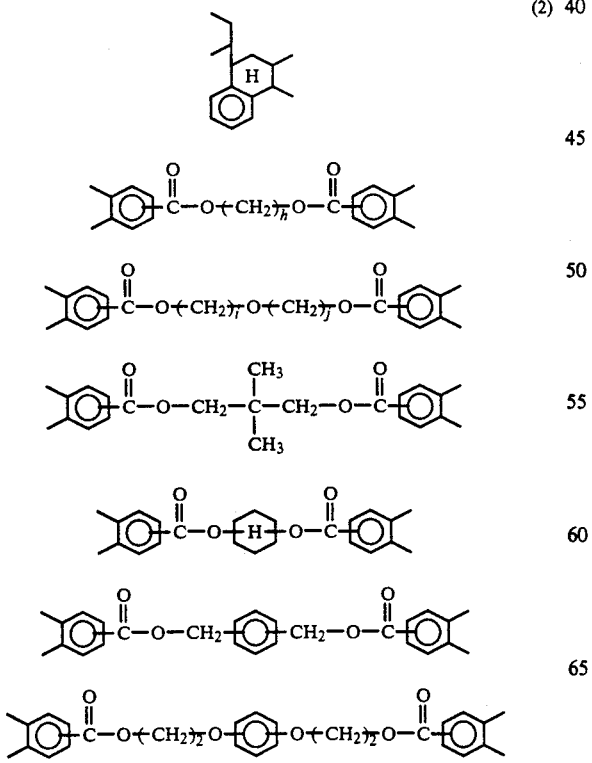

(2)

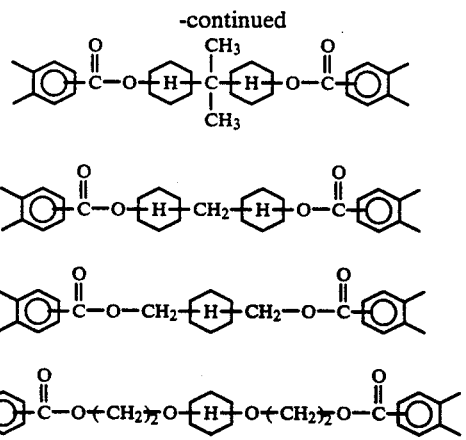

-continued h being an integer of 2-16, and
i and j being individually an integer of 2-10,
and R² represents a divalent organic group selected from the group consisting of divalent organic groups represented by the following formulae (5):

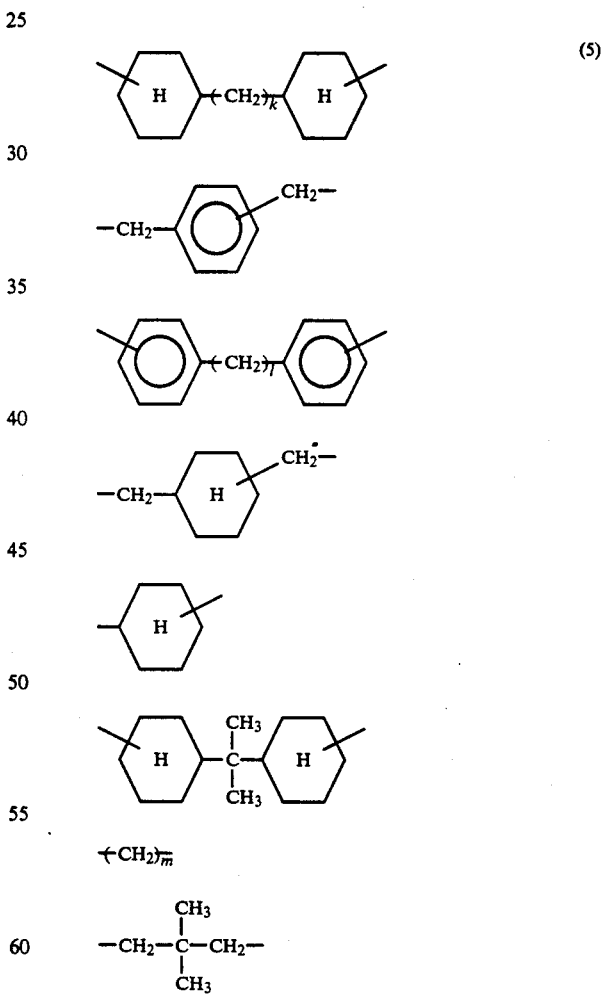

(5)

k being an integer of 1-10, and
l and m being individually an integer of 2-10
when R¹ is a tetravalent organic group selected from the group consisting of tetravalent organic groups represented by the following formulae (4):

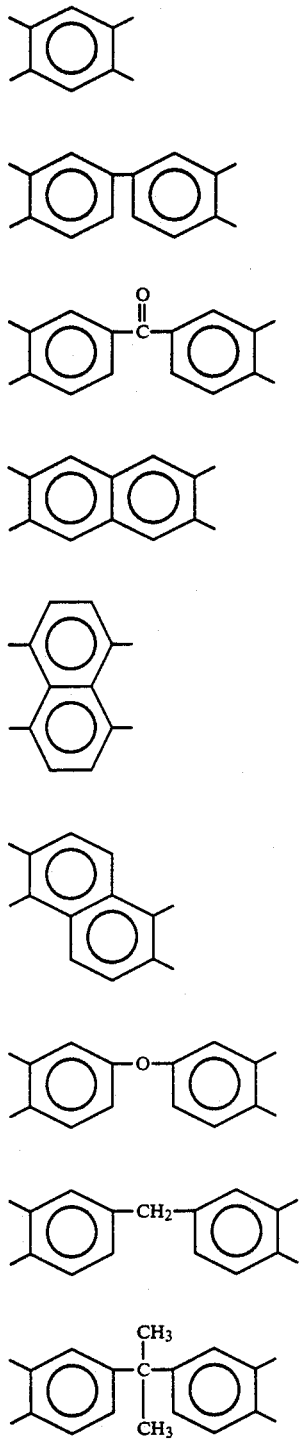

and (b) an isocyanate or blocked isocyanate; and
ii) baking the thus-coated composition.

6. A process for the production of a solderable insulated wire, which comprises:
i) coating a conductor with an insulating coating composition comprising (a) a polyamic acid represented by the following formula (1):

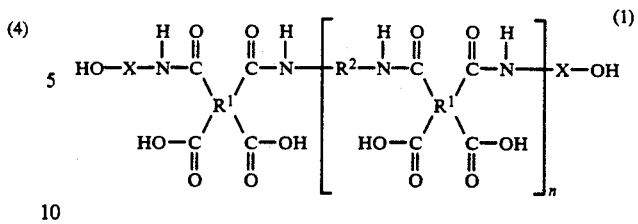

wherein
X represents an alkylene or alkylenephenylene group,
n represents a positive integer,
$R^1$ represents a tetravalent organic group, and
$R^2$ represents a divalent organic group, with the proviso that $R^2$ represents a divalent organic group selected from the group consisting of divalent organic groups represented by the following formulae (3):

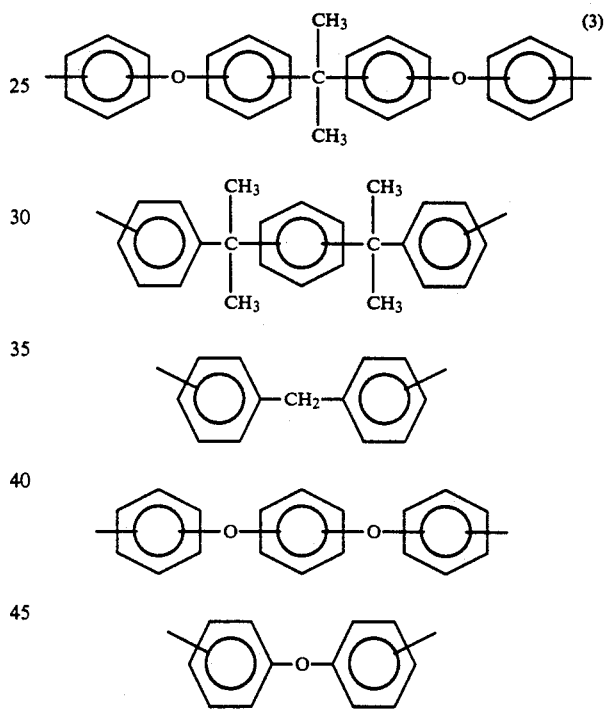

when $R^1$ is a tetravalent organic group selected from the group consisting of tetravalent organic groups represented by the following formulae (2):

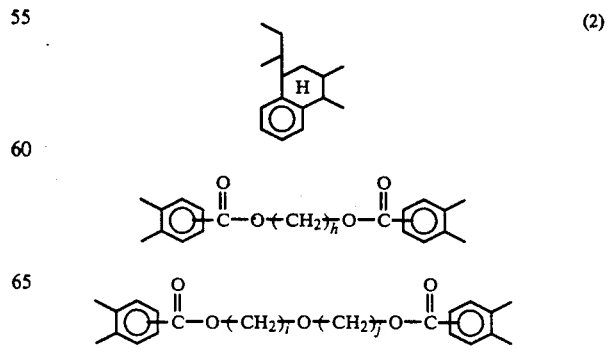

-continued

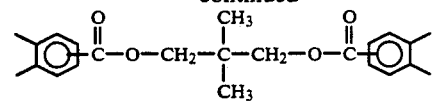
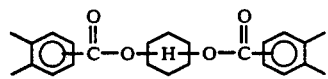
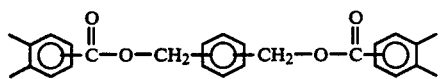
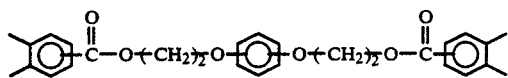
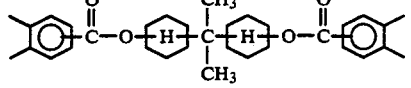
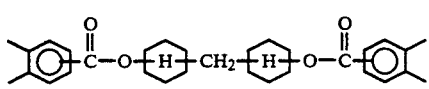
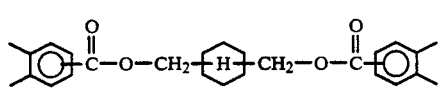
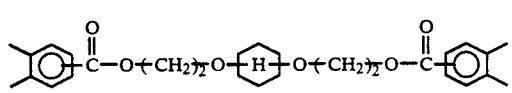

h being an integer of 2-16, and
i and j being individually an integer of 2-10,
and $R^2$ represents a divalent organic group selected from the group consisting of divalent organic groups represented by the following formulae (5):

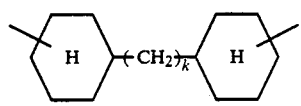

(5)

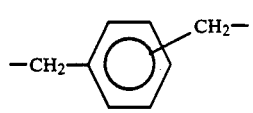
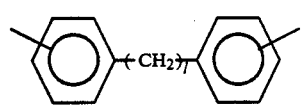
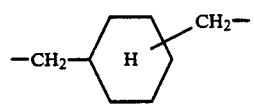
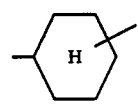
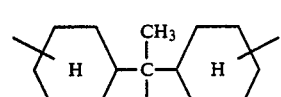

-continued

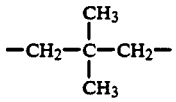

k being an integer of 1-10, and
l and m being individually an integer of 2-10
when $R^1$ is a tetravalent organic group selected from the group consisting of tetravalent organic groups represented by the following formulae (4):

(4)

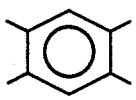
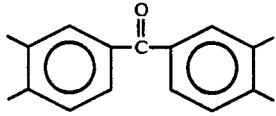
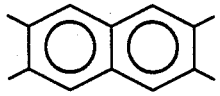
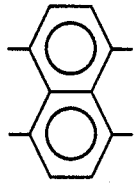
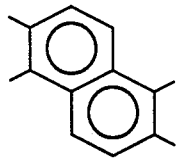
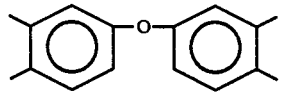
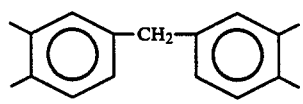
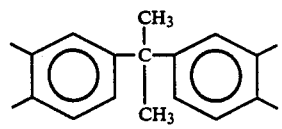

and (b) an isocyanate or blocked isocyanate, said polyamic acid and said isocyanate or blocked isocyanate being proportioned such that said composition contains 0.4–2.0 equivalents of isocyanate groups per equivalent of terminal hydroxyl groups of said polyamic acid; and ii) baking the thus-coated composition, whereby the amido groups and carboxyl groups of the polyamic acid undergo an intramolecular reaction to imidate the polyamic acid and the terminal hydroxyl groups of the polyamic acid react with the isocyanate or blocked isocyanate to form an imidated polyurethane resin.

7. The process of claim 6, wherein said insulating coating composition further comprises a catalytic amount of a tertiary amine.

8. An insulating coating composition comprising:

(a) a polyamic acid represented by the following formula (1):

$$HO-X-N(H)-C(=O)-C(R^1)(C(=O)OH)-C(R^1)(C(=O)OH)-C(=O)-N(H)-[R^2-N(H)-C(=O)-C(R^1)(C(=O)OH)-C(R^1)(C(=O)OH)-C(=O)-N(H)-]_n X-OH \quad (1)$$

wherein

X represents an alkylene or alkylenephenylene group, n represents a positive integer, $R^1$ represents a tetravalent organic group, and $R^2$ represents a divalent organic group, with the proviso that $R^2$ represents a divalent organic group selected from the group consisting of divalent organic groups represented by the following formulae (3):

(3)

when $R^1$ is a tetravalent organic group selected from the group consisting of tetravalent organic groups represented by the following formulae (2):

(2)

h being an integer of 2–16, and i and j being individually an integer of 2–10, and $R^2$ represents a divalent organic group selected from the group consisting of divalent organic groups represented by the following formulae (5):

(5)

-continued

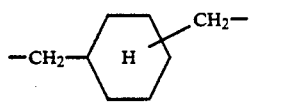

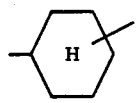

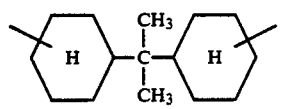

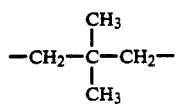

k being an integer of 1-10, and l and m being individually an integer of 2-10 when R¹ is a tetravalent organic group selected from the group consisting of tetravalent organic groups represented by the following formulae (4):

(4)

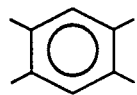

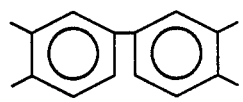

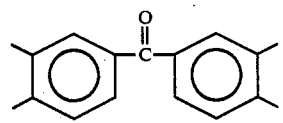

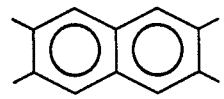

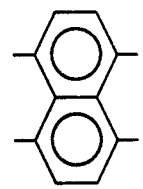

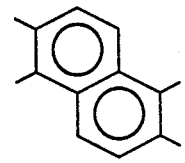

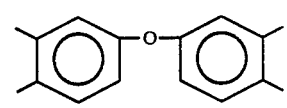

-continued

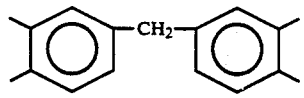

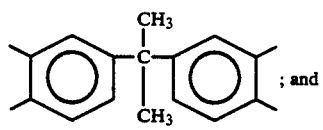  ; and (b) an isocyanate or blocked isocyanate, said polyamic acid and said isocyanate or blocked isocyanate being proportioned such that said composition contained 0.4–2.0 equivalents of isocyanate groups per equivalent of terminal hydroxyl groups of said polyamic acid.

9. A solderable, insulated wire having a polyimide resin coating, which has been produced by:

i) coating a conductor with an insulating coating composition comprising a polyimide represented by the following formula (9):

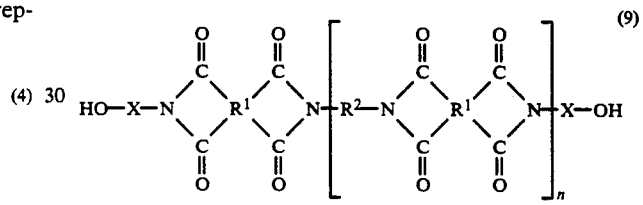

(9)

wherein

X represents an alkylene or alkylenephenylene group, n represents a positive integer, R¹ represents a tetravalent organic group, and R² represents a divalent organic group, with the proviso that R² represents a divalent organic group selected from the group consisting of divalent organic groups represented by the following formulae (3):

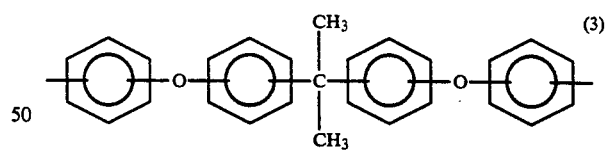

(3)

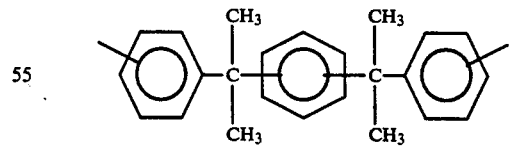

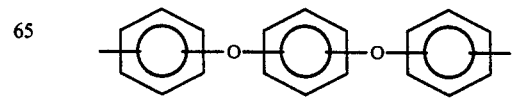

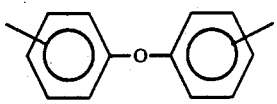

when R[1] is a tetravalent organic group selected from the group consisting of tetravalent organic groups represented by the following formulae (2):

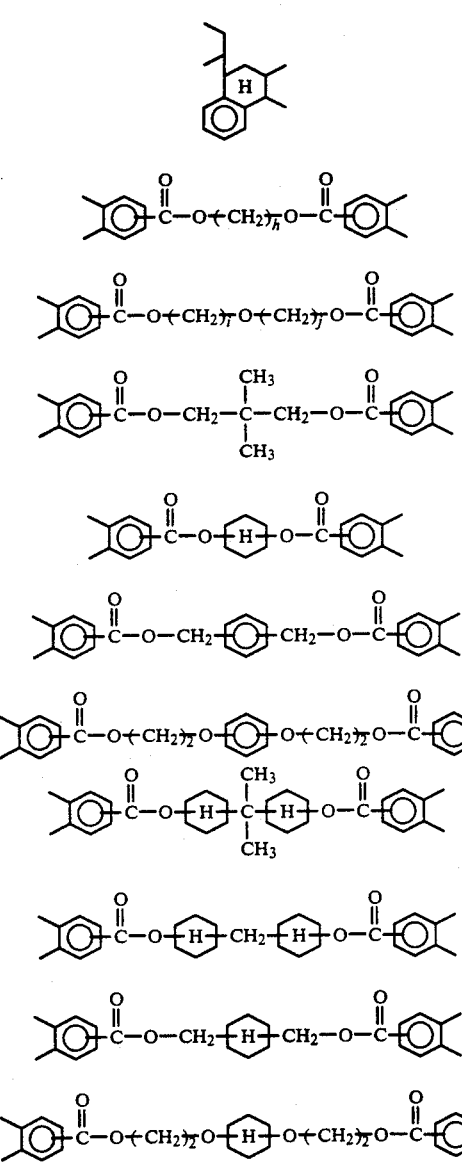

(2)

h being an integer of 2-16, and
i and j being individually an integer of 2-10,
and R[2] represents a divalent organic group selected from the group consisting of divalent organic groups represented by the following formulae (5):

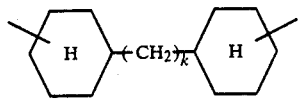

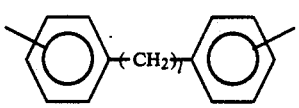

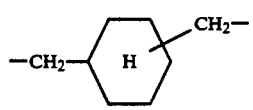

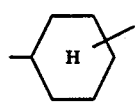

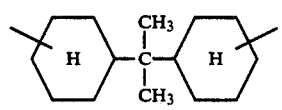

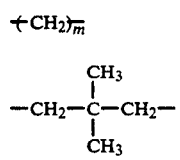

k being an integer of 1-10, and
l and m being individually an integer of 2-10
when R[1] is a tetravalent organic group selected from the group consisting of tetravalent organic groups represented by the following formulae (4):

(4)

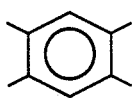

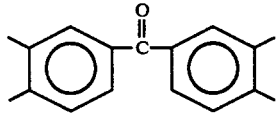

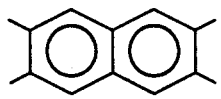

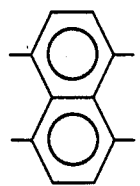

-continued

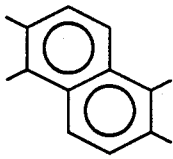

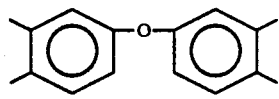

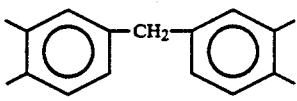

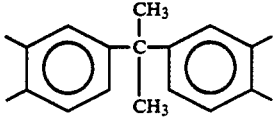

ii) baking the thus-coated composition.

10. A process for the production of a solderable, insulated wire, which comprises:

i) reacting a hydroxylamine represented by the following formula (6):

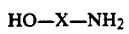

a tetracarboxylic dianhydride represented by the following formula (7):

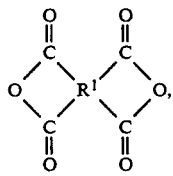

and a diamine represented by the following formula (8):

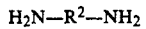

in the presence of an organic solvent to form a polyamic acid represented by the following formula (9):

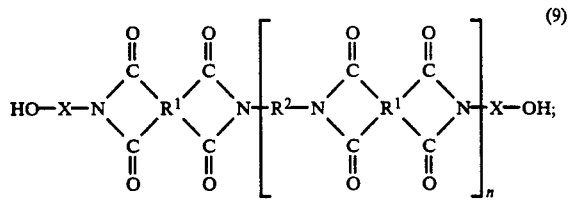

ii) coating a conductor with an insulating coating composition, which comprises the polyamic acid of the formula (9); and iii) baking the thus-coated composition, in said formulae (6), (7), (8) and (9), X being an alkylene or alkylenephenylene group,
n being a positive integer, $R^1$ represents a tetravalent organic group, and
$R^2$ represents a divalent organic group, with the proviso that $R^2$ represents a divalent organic group selected from the group consisting of divalent organic groups represented by the following formulae (3):

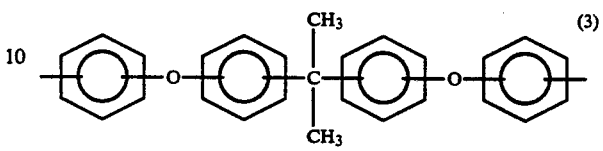

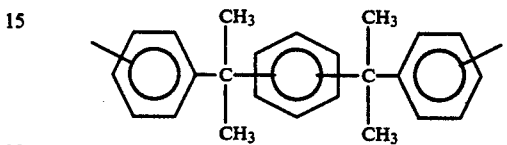

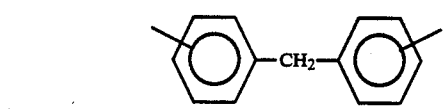

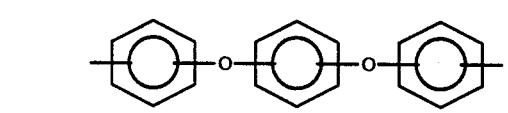

when $R^1$ is a tetravalent organic group selected from the group consisting of tetravalent organic groups represented by the following formulae (2):

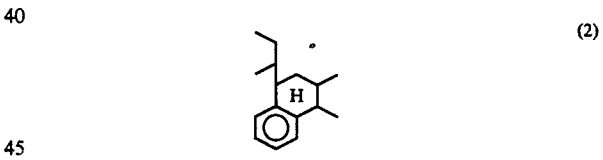

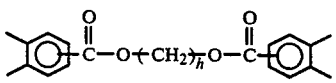

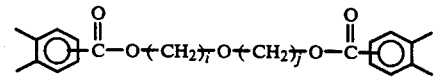

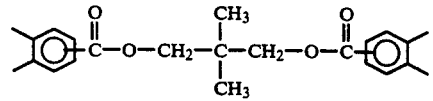

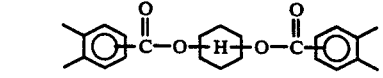

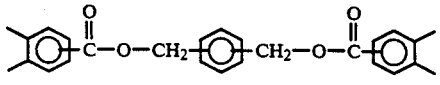

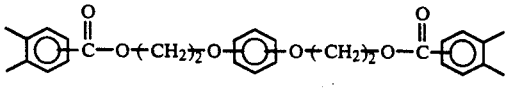

-continued

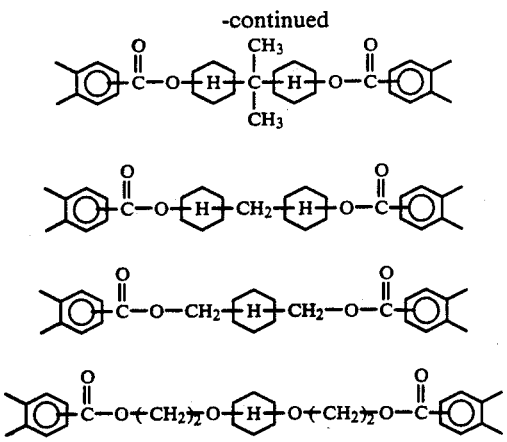

h being an integer of 2-16, and
i and j being individually an integer of 2-10,
and R² represents a divalent organic group selected from the group consisting of divalent organic groups represented by the following formulae (5):

(5)

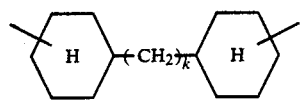

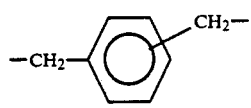

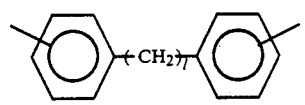

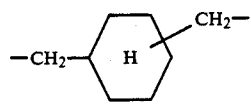

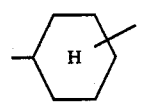

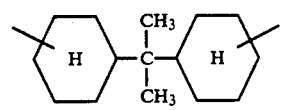

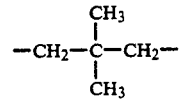

k being an integer of 1-10, and
l and m being individually an integer of 2-10
when R¹ is a tetravalent organic group selected from the group consisting of tetravalent organic groups represented by the following formulae (4):

(4)

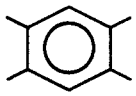

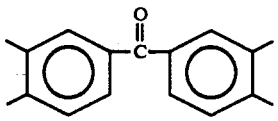

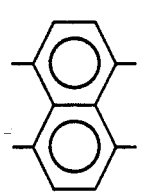

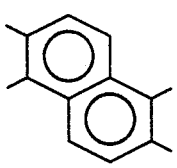

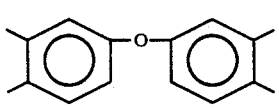

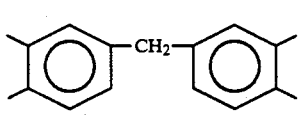

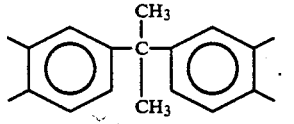

11. An insulating coating composition comprising a polyimide represented by the following formula (9):

(9)

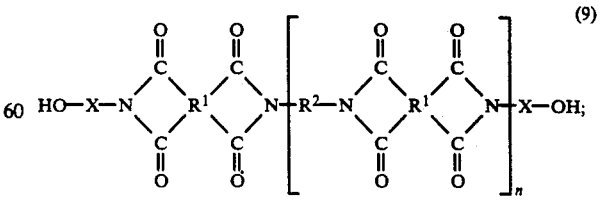

wherein
X being an alkylene or alkylenephenylene group,
n being a positive integer,
R¹ represents a tetravalent organic group, and $R^2$ represents a divalent organic group, with the proviso that $R^2$ represents a divalent organic group selected from the group consisting of divalent organic groups represented by the following formulae (3):

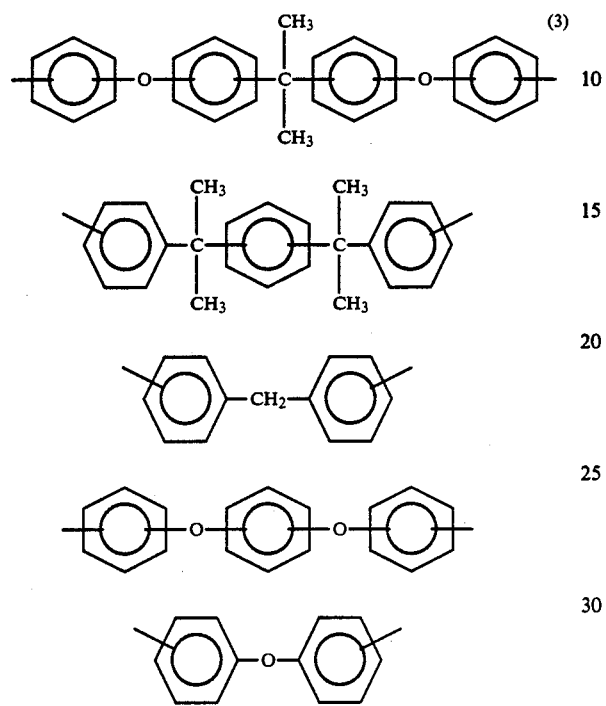

when $R^1$ is a tetravalent organic group selected from the group consisting of tetravalent organic groups represented by the following formulae (2):

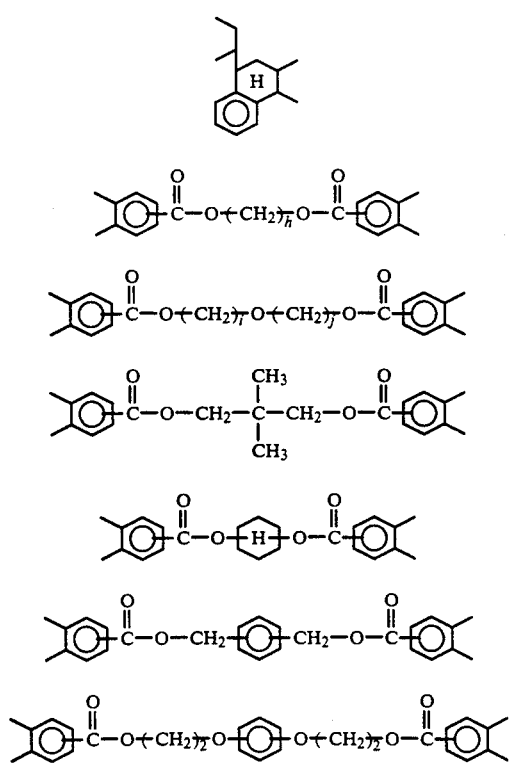

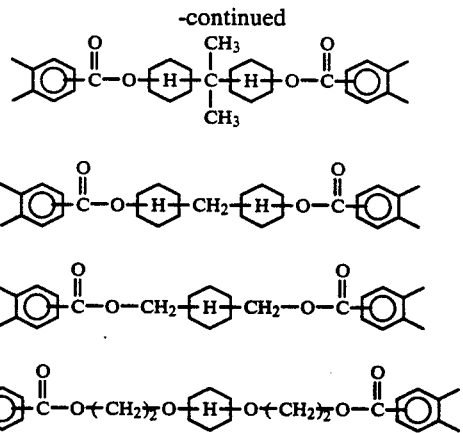

h being an integer of 2–16, and
i and j being individually an integer of 2–10,
and $R^2$ represents a divalent organic group selected from the group consisting of divalent organic groups represented by the following formulae (5):

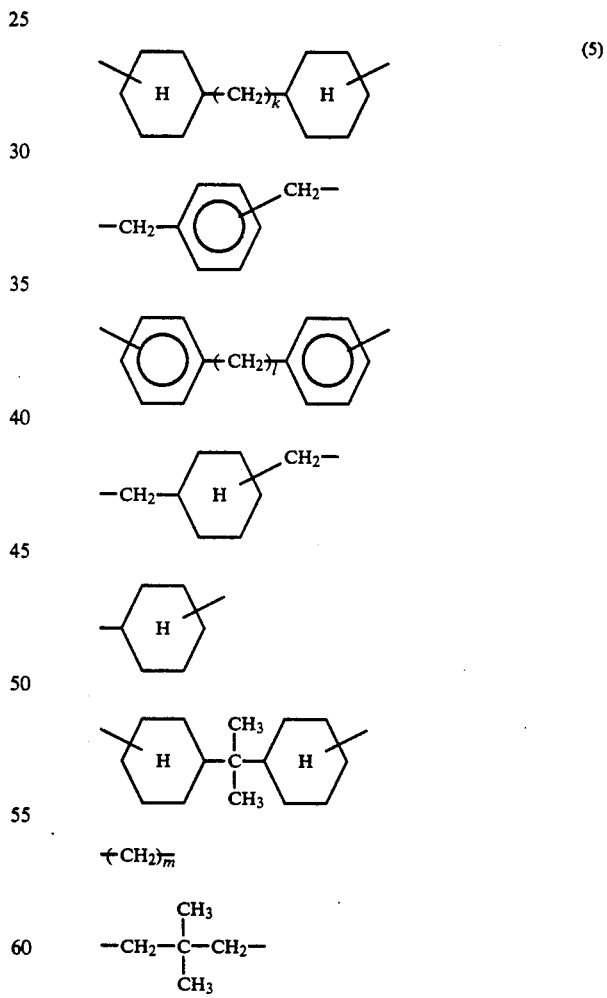

k being an integer of 1–10, and
l and m being individually an integer of 2–10
when $R^1$ is a tetravalent organic group selected from the group consisting of tetravalent organic groups represented by the following formulae (4):

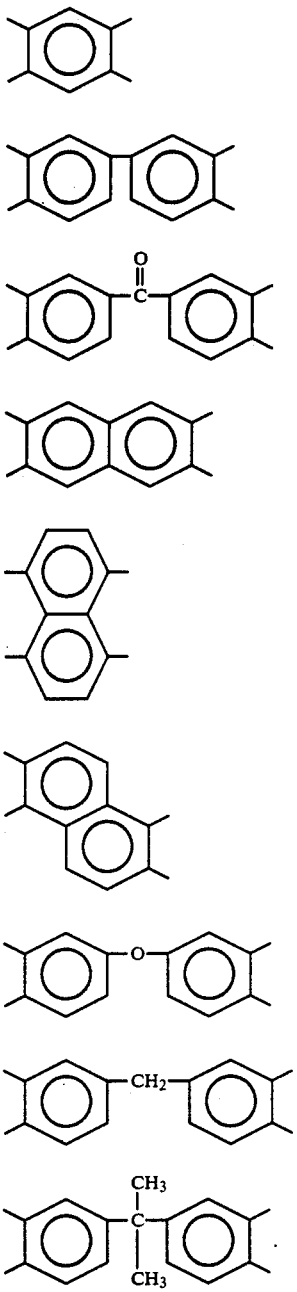

12. A solderable, insulated wire having a coating of a polyimide resin represented by the following formula (10):

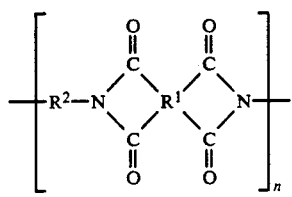

wherein
n being a positive integer,
$R^1$ represents a tetravalent organic group, and $R^2$ represents a divalent organic group, with the proviso that $R^2$ represents a divalent organic group selected from the group consisting of divalent organic groups represented by the following formulae (3):

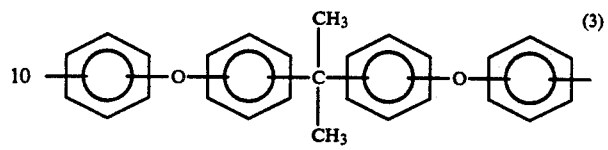

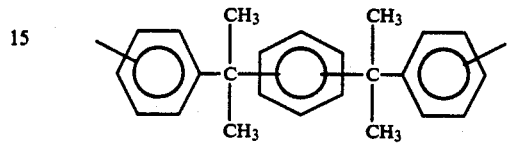

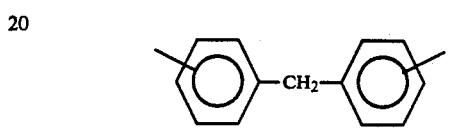

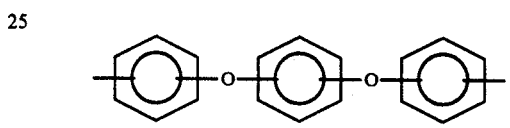

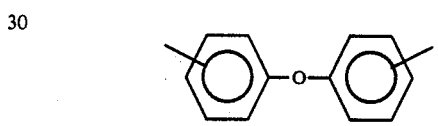

when $R^1$ is a tetravalent organic group selected from the group consisting of tetravalent organic groups represented by the following formulae (2):

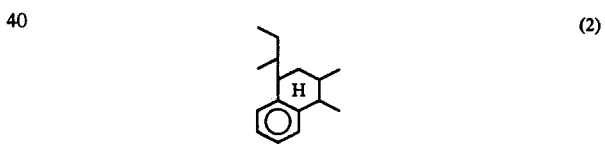

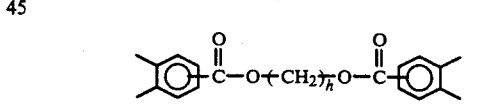

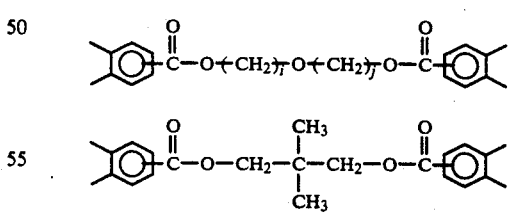

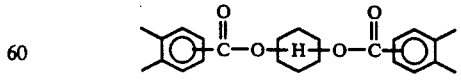

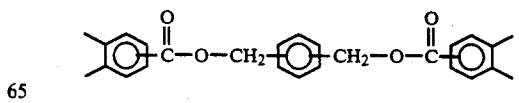

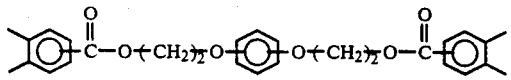

-continued

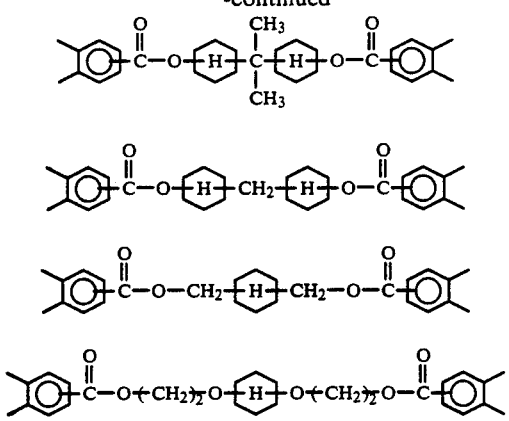

h being an integer of 2-16, and i and j being individually an integer of 2-10, and $R^2$ represents a divalent organic group selected from the group consisting of divalent organic groups represented by the following formulae (5):

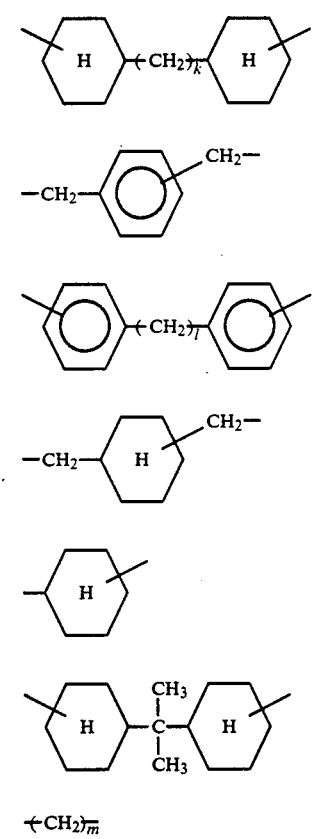

(5)

k being an integer of 1-10, and l and m being individually an integer of 2-10 when $R^1$ is a tetravalent organic group selected from the group consisting of tetravalent organic groups represented by the following formulae (4):

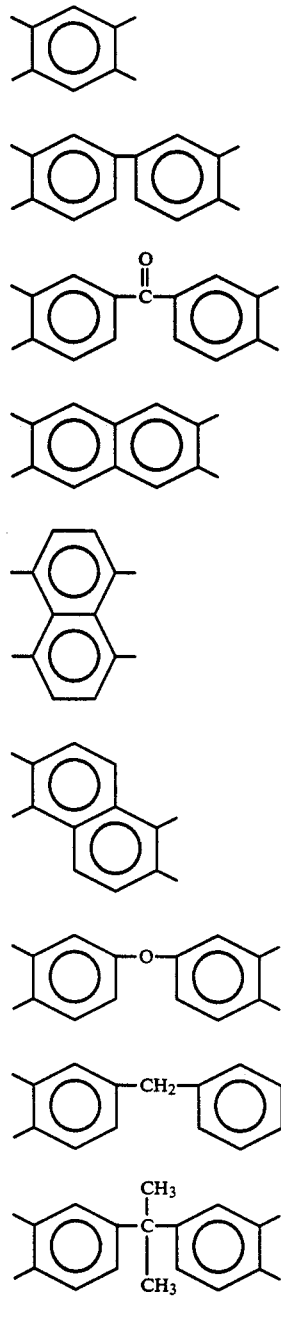

(4)

13. A process for the production of a solderable, insulated wire, which comprises:

i) reacting a tetracarboxylic dianhydride represented by the following formula (7):

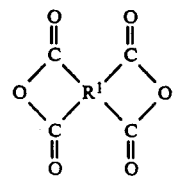

(7)

and a diamine represented by the following formula (8):

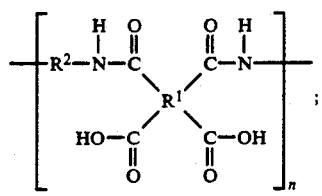
(8)

in the presence of an organic solvent to form a polyamic acid represented by the following formula (11):

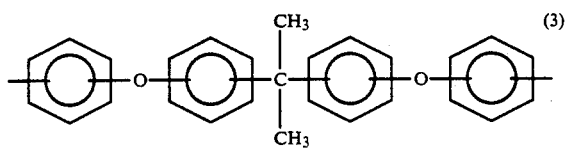
(11)

ii) coating a conductor with an insulating coating composition, which comprises the polyamic acid of the formula (11); and iii) baking the thus-coated composition whereby the amido groups and carboxyl groups in the formula (11) are caused to undergo an intramolecular reaction and the polyamic acid of the formula (11) is imidated into a polyimide resin, wherein in said formulae (7), (8) and (11), n being a positive integer, $R^1$ represents a tetravalent organic group, and $R^2$ represents a divalent organic group, with the proviso that $R^2$ represents a divalent organic group selected from the group consisting of divalent organic groups represented by the following formulae (3):

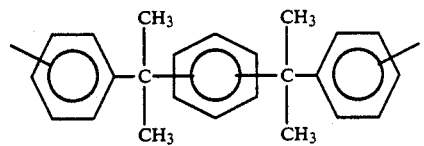
(3)

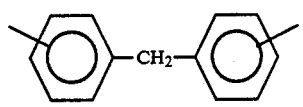

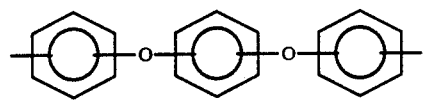

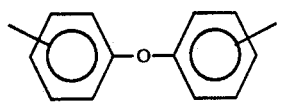

when $R^1$ is a tetravalent organic group selected from the group consisting of tetravalent organic groups represented by the following formulae (2):

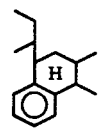
(2)

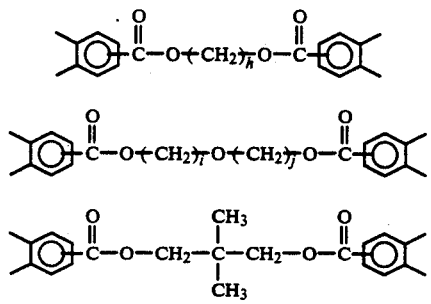

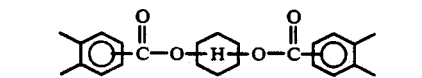

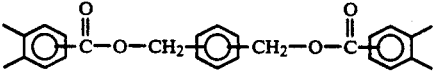

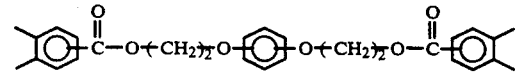

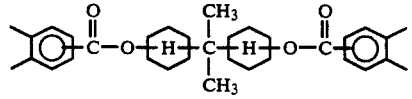

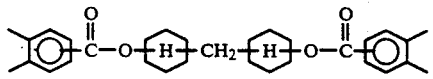

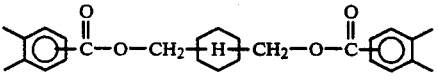

h being an integer of 2–16, and i and j being individually an integer of 2–10, and $R^2$ represents a divalent organic group selected from the group consisting of divalent organic groups represented by the following formulae (5):

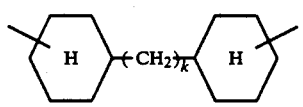
(5)

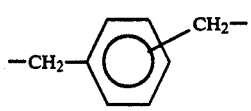

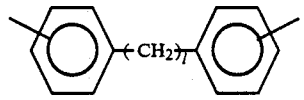

-continued

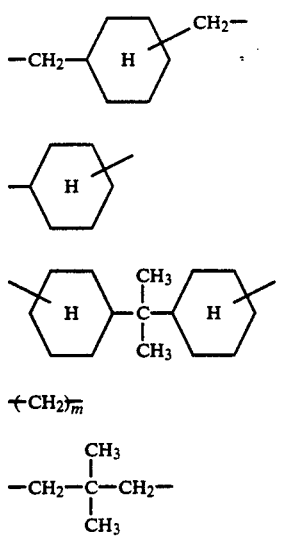

k being an integer of 1-10, and l and m being individually an integer of 2-10 when $R^1$ is a tetravalent organic group selected from the group consisting of tetravalent organic groups represented by the following formulae (4):

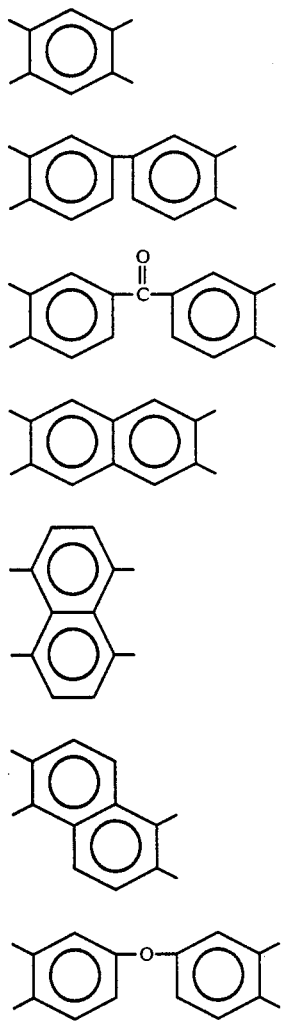
(4)

-continued

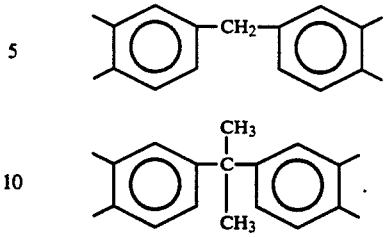

14. The process of claim 13, wherein said insulating coating composition further comprises a catalytic amount of a tertiary amine.

15. An insulating coating composition comprising a polyamide acid represented by the following formula (11):

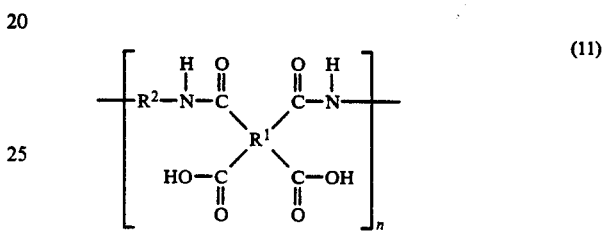
(11)

wherein
n represents a positive integer,
$R^1$ represents a tetravalent organic group, and
$R^2$ represents a divalent organic group, with the proviso that $R^2$ represents a divalent organic group selected from the group consisting of divalent organic groups represented by the following formulae (3):

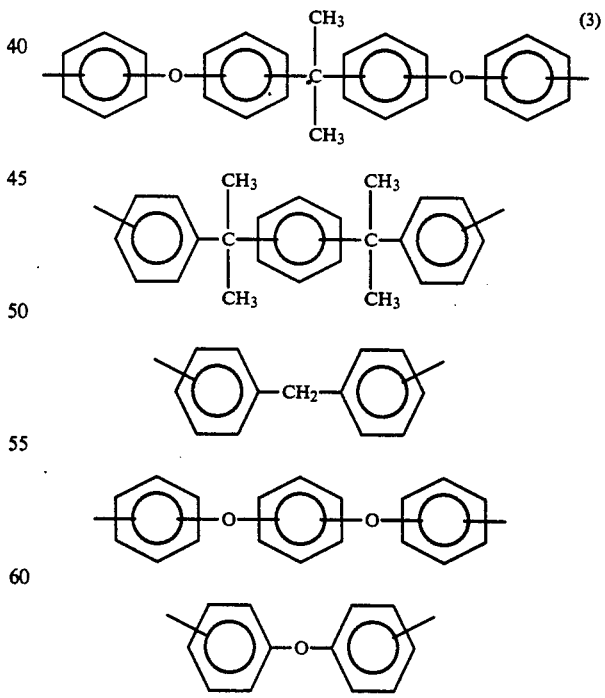
(3)

when $R^1$ is a tetravalent organic group selected from the group consisting of tetravalent organic groups represented by the following formulae (2):

(2)

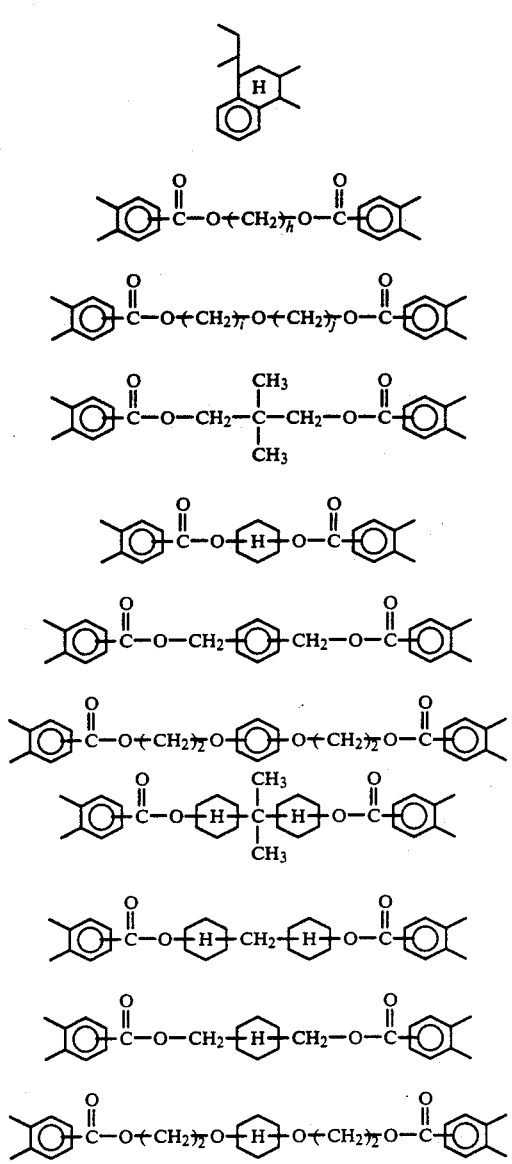

h being an integer of 2-16, and
i and j being individually an integer of 2-10,
and $R^2$ represents a divalent organic group selected from the group consisting of divalent organic groups represented by the following formulae (5):

(5)

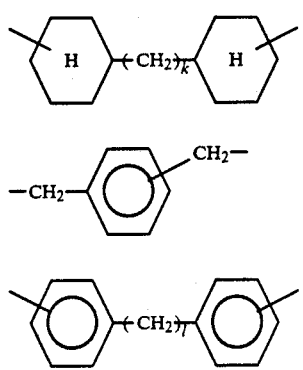

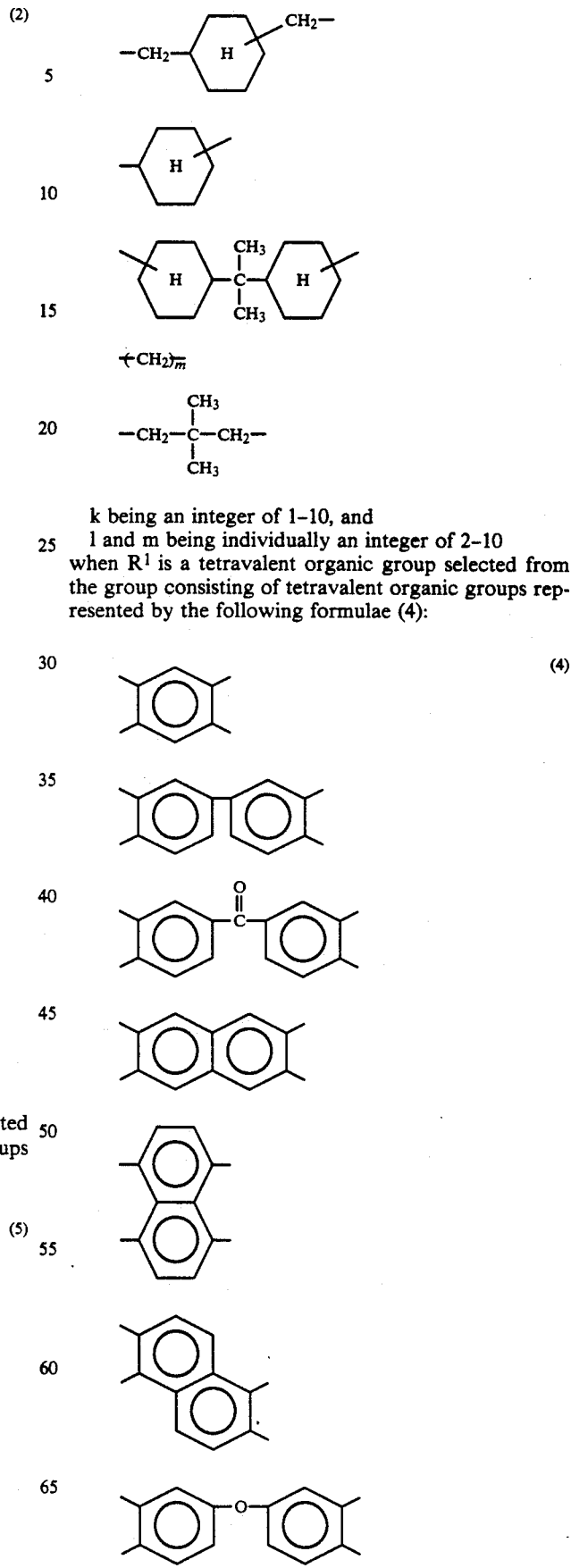

k being an integer of 1-10, and
l and m being individually an integer of 2-10
when $R^1$ is a tetravalent organic group selected from the group consisting of tetravalent organic groups represented by the following formulae (4):

(4)

-continued

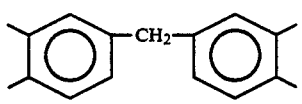

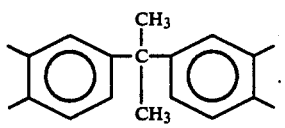

16. A process for the production of a solderable, insulated wire having a coating of a polyimide resin represented by the following formula (10):

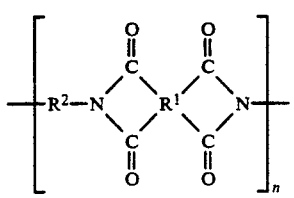

(10)

wherein
  n represents a positive integer,
  $R^1$ represents a tetravalent organic group, and
  $R^2$ represents a divalent organic group, with the proviso that $R^2$ represents a divalent organic group selected from the group consisting of divalent organic groups represented by the following formulae (3):

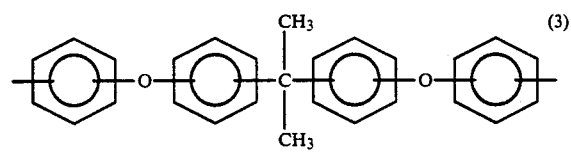

(3)

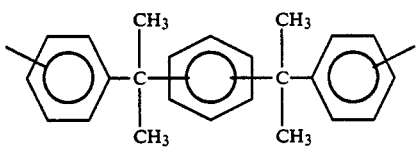

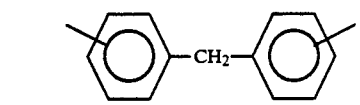

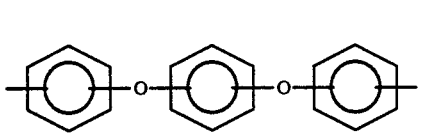

when $R^1$ is a tetravalent organic group selected from the group consisting of tetravalent organic groups represented by the following formulae (2):

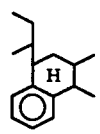

(2)

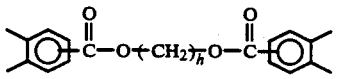

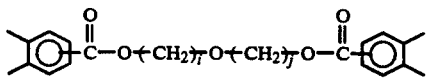

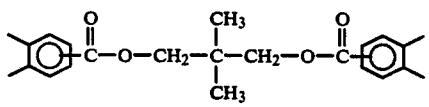

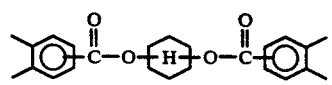

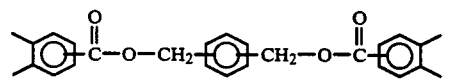

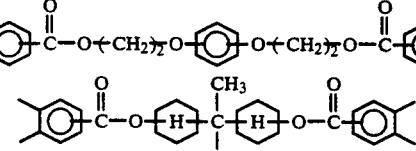

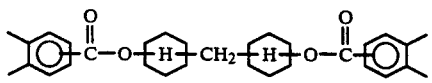

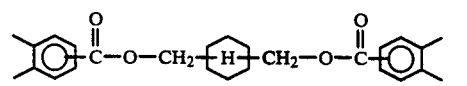

h being an integer of 2–16, and
i and j being individually an integer of 2–10,
and $R^2$ represents a divalent organic group selected from the group consisting of divalent organic groups represented by the following formulae (5):

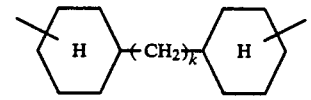

(5)

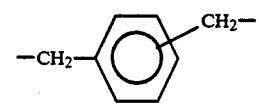

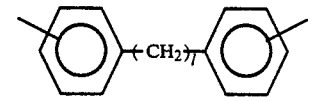

-continued

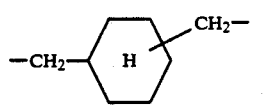

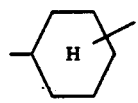

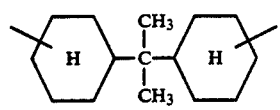

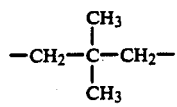

k being an integer of 1-10, and
l and m being individually an integer of 2-10
when $R^1$ is a tetravalent organic group selected from the group consisting of tetravalent organic groups represented by the following formulae (4):

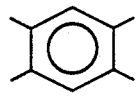  (4)

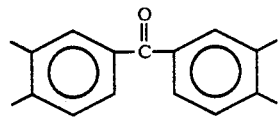

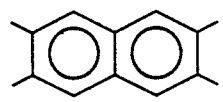

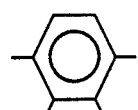

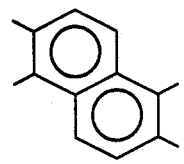

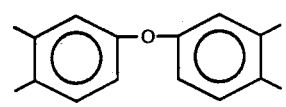

-continued

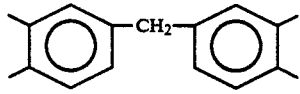

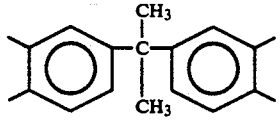

which comprises:
i) coating a conductor with an insulating coating composition which comprises a polyimide represented by the formula (10); and
ii) baking the thus-coated composition.

17. A process for the production of a solderable, insulated wire, which comprises:
i) reacting a tetracarboxylic dianhydride represented by the following formula (7):

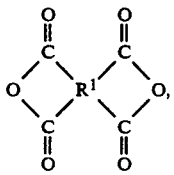  (7)

and a diamine represented by the following formula (8):

$H_2N-R^2-NH_2$ in the presence of an organic solvent to form a polyamic acid represented by the following formula (11):

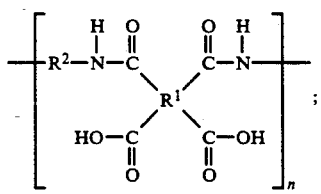  (11)

ii) imidating the polyamic acid to form a polyimide represented by the following formula (10):

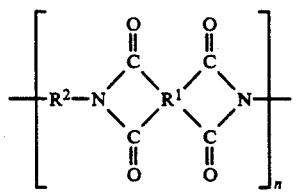  (10)

iii) coating a conductor with an insulating coating composition, which comprises the polyimide acid of the formula (10); and
iv) baking the thus-coated composition in said formulae (7), (8), (10) and (11),
n being a positive integer,
$R^1$ represents a tetravalent organic group, and $R^2$ represents a divalent organic group, with the proviso that $R^2$ represents a divalent organic group selected from the group consisting of divalent organic groups represented by the following formulae (3):

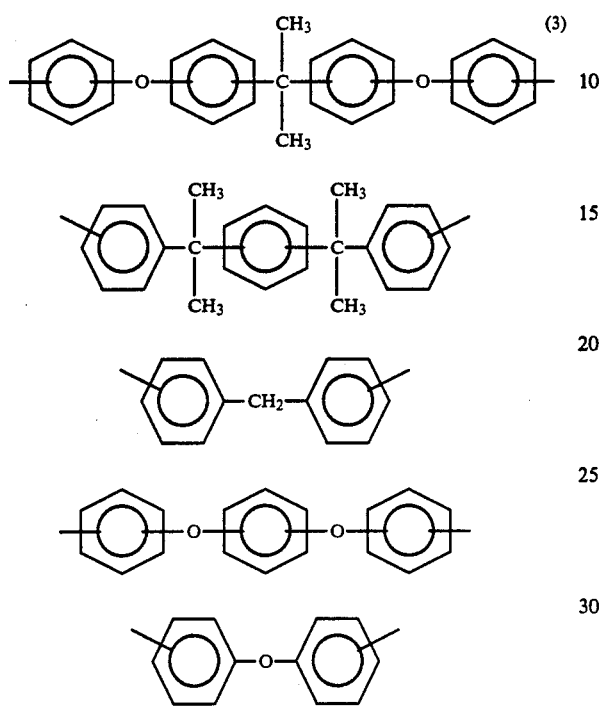

(3)

when $R^1$ is a tetravalent organic group selected from the group consisting of tetravalent organic groups represented by the following formulae (2):

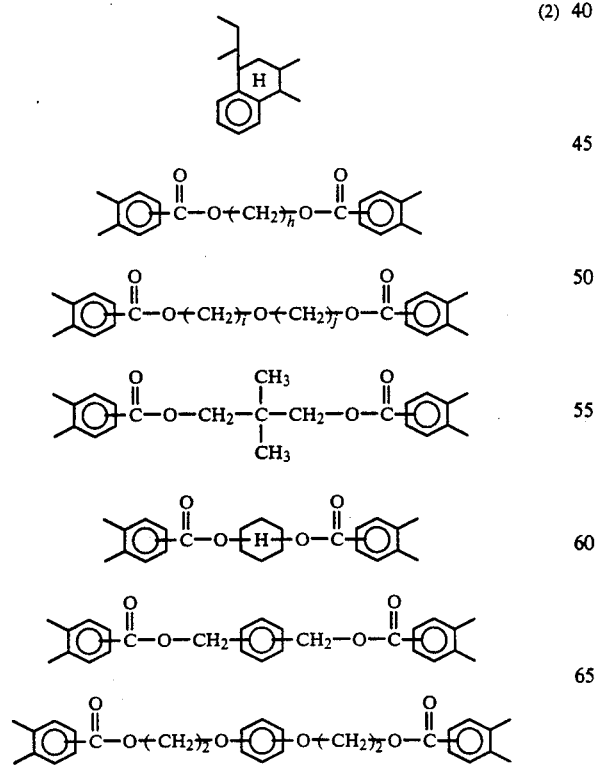

(2)

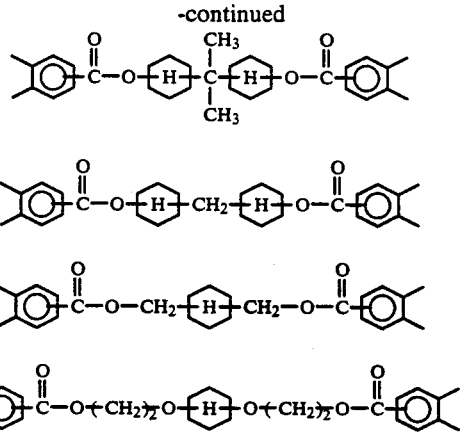

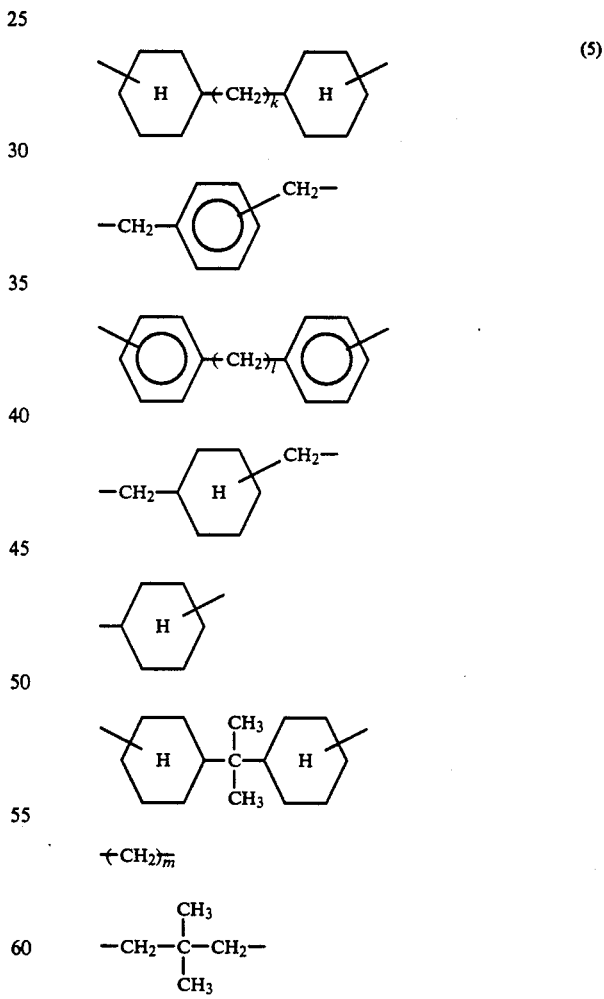

h being an integer of 2-16, and
i and j being individually an integer of 2-10,
and $R^2$ represents a divalent organic group selected from the group consisting of divalent organic groups represented by the following formulae (5):

(5)

k being an integer of 1-10, and
l and m being individually an integer of 2-10
when $R^1$ is a tetravalent organic group selected from the group consisting of tetravalent organic groups represented by the following formulae (4):

(4)

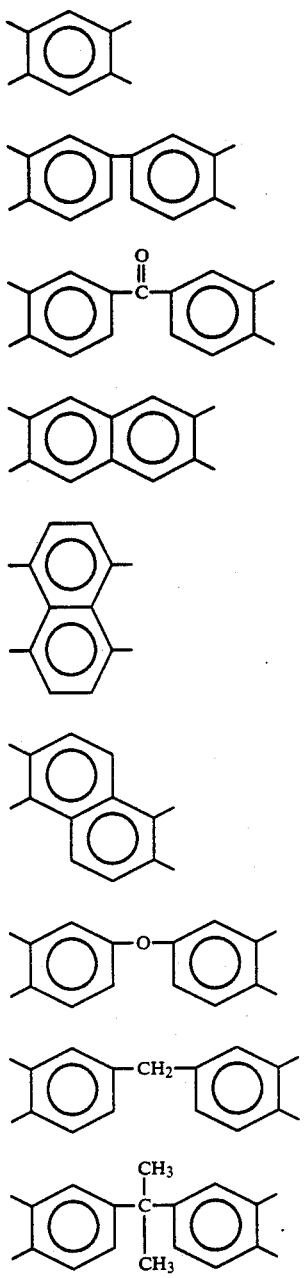

18. An insulating coating composition comprising a polyimide represented by the following formula (10):

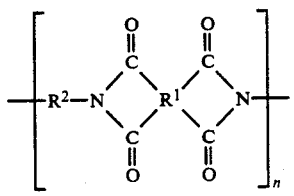

wherein
n represents a positive integer,
$R^1$ represents a tetravalent organic group, and
$R^2$ represents a divalent organic group, with the proviso that $R^2$ represents a divalent organic group selected from the group consisting of divalent organic groups represented by the following formulae (3):

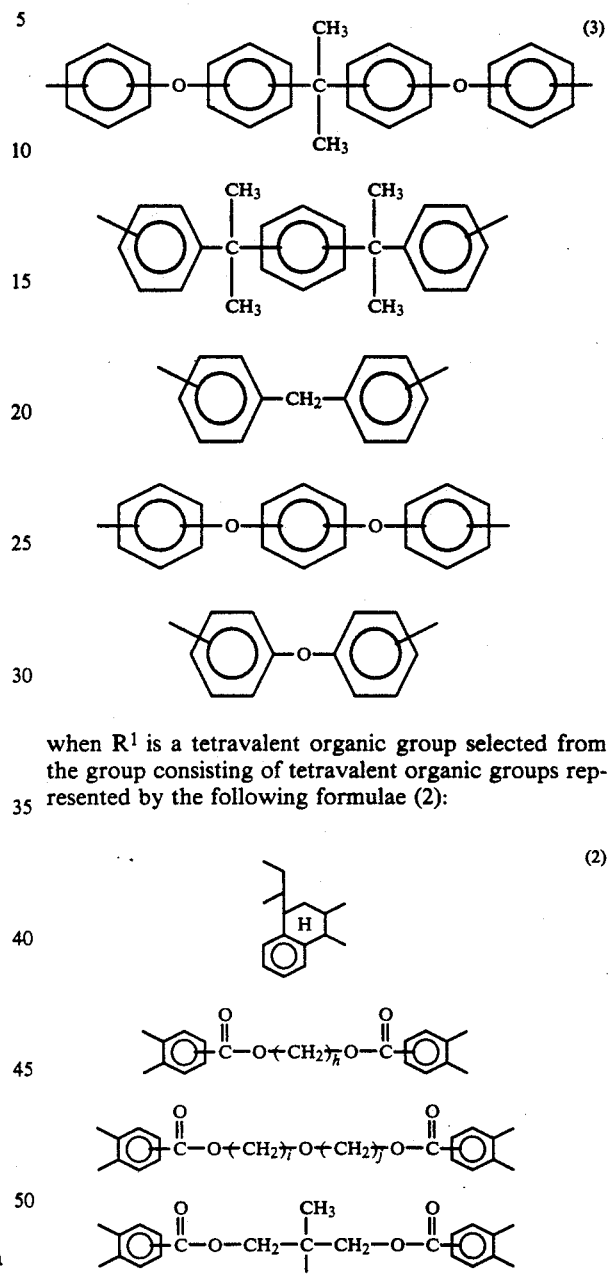

when $R^1$ is a tetravalent organic group selected from the group consisting of tetravalent organic groups represented by the following formulae (2):

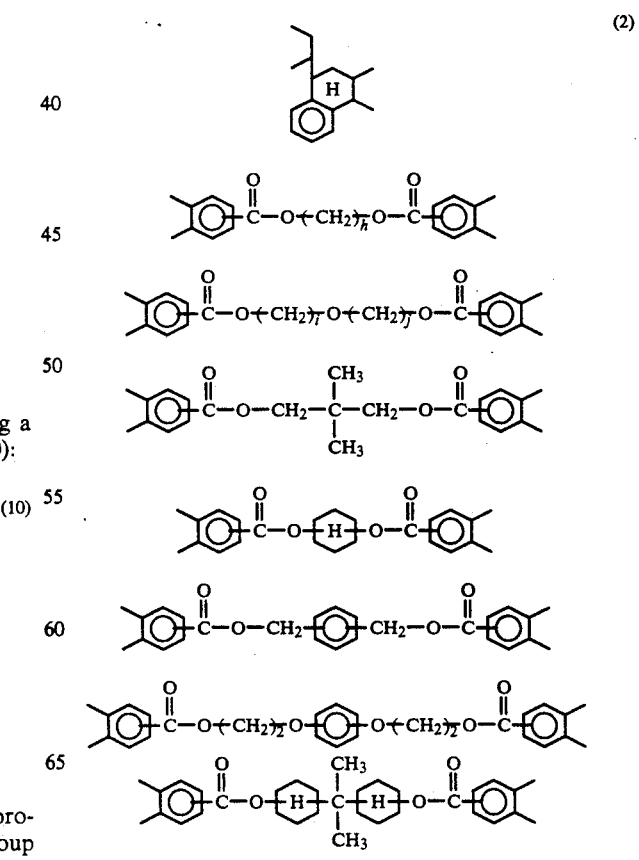

-continued

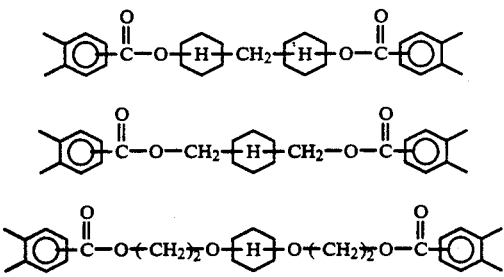

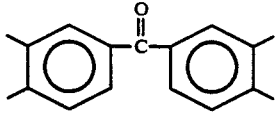

h being an integer of 2-16, and
i and j being individually an integer of 2-10,
and $R^2$ represents a divalent organic group selected from the group consisting of divalent organic groups represented by the following formulae (5):

(5)

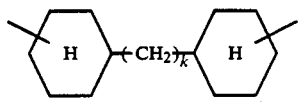

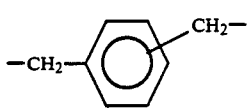

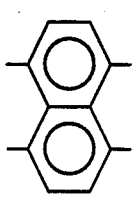

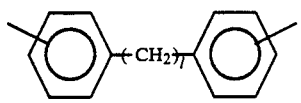

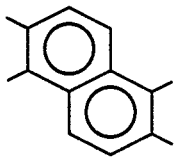

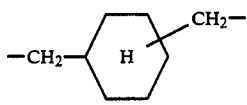

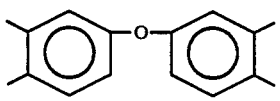

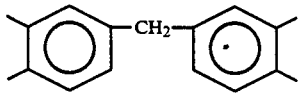

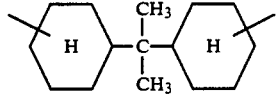

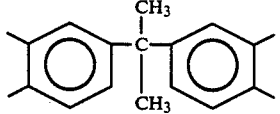

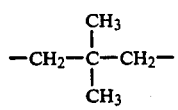

k being an integer of 1-10, and
l and m being individually an integer of 2-10
when $R^1$ is a tetravalent organic group selected from the group consisting of tetravalent organic groups represented by the following formulae (4):

(4)

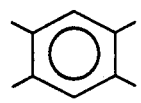

which comprises:
i) coating a conductor with an insulating coating composition, which comprises a polyimide represented by the formula (10); and
ii) baking the thus-coated composition.

19. The insulated wire of claim 1, wherein X is an alkylene group selected from the group consisting of alkylene groups represented by the following formula (12):

 (12)

or an alkylenephenylene group selected rom the group consisting of alkylenephenylene groups represented by the following formula (13):

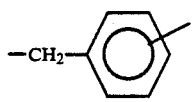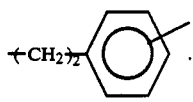 (13)

20. The process of claim 2, wherein X is an alkylene group selected from the group consisting of alkylene groups represented by the following formula (12):

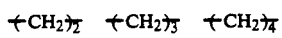 (12)

or an alkylenephenylene group selected from the group consisting of alkylenephenylene groups represented by the following formula (13):

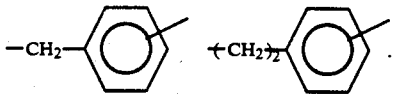 (13)

21. The insulating coating composition of claim 4, wherein X is an alkylene group selected from the group consisting of alkylene groups represented by the following formula (12):

 (12)

or an alkylenephenylene group selected from the group consisting of alkylenephenylene groups represented by the following formula (13):

 (13)

22. A flyback transformer comprising the insulated wire of claim 1.

* * * * *